(12) United States Patent
Huang et al.

(10) Patent No.: US 12,503,700 B2
(45) Date of Patent: Dec. 23, 2025

(54) CONTROL OF TOTAL AFUCOSYLATED GLYCOFORMS OF ANTIBODIES PRODUCED IN CELL CULTURE

(71) Applicant: AMGEN INC., Thousand Oaks, CA (US)

(72) Inventors: Chung-Jr Huang, Newbury Park, CA (US); Prince Bhebe, Moorpark, CA (US); Madiha Khurshid, Thousand Oaks, CA (US); Li Zhang, Camarillo, CA (US)

(73) Assignee: AMGEN INC., Thousand Oaks, CA (US)

( * ) Notice: Subject to any disclaimer, the term of this patent is extended or adjusted under 35 U.S.C. 154(b) by 519 days.

(21) Appl. No.: 16/494,093

(22) PCT Filed: Mar. 14, 2018

(86) PCT No.: PCT/US2018/022388
§ 371 (c)(1),
(2) Date: Sep. 13, 2019

(87) PCT Pub. No.: WO2018/170099
PCT Pub. Date: Sep. 20, 2018

(65) Prior Publication Data
US 2020/0131518 A1   Apr. 30, 2020

Related U.S. Application Data

(60) Provisional application No. 62/471,347, filed on Mar. 14, 2017.

(51) Int. Cl.
| C12N 15/113 | (2010.01) |
| C07K 16/28 | (2006.01) |
| C12P 21/00 | (2006.01) |

(52) U.S. Cl.
CPC .......... *C12N 15/1138* (2013.01); *C07K 16/28* (2013.01); *C12P 21/005* (2013.01); *C07K 2317/41* (2013.01)

(58) Field of Classification Search
None
See application file for complete search history.

(56) References Cited

U.S. PATENT DOCUMENTS

| | | | |
|---|---|---|---|
| 5,821,337 A * | 10/1998 | Carter | C07K 16/32 530/387.3 |
| 6,143,874 A | 11/2000 | Chang | |
| 6,184,359 B1 | 2/2001 | Grabstein et al. | |
| 6,232,447 B1 | 5/2001 | Cerretti | |
| 6,235,883 B1 | 5/2001 | Jakobovits et al. | |
| 6,319,499 B1 | 11/2001 | Elliott | |
| 6,355,779 B1 | 3/2002 | Goodwin et al. | |
| 6,500,429 B2 | 12/2002 | Boone et al. | |
| 6,596,852 B2 | 7/2003 | Cerretti et al. | |
| 6,630,143 B1 | 10/2003 | Lyman et al. | |
| 6,682,736 B1 | 1/2004 | Hanson et al. | |
| 6,692,740 B2 | 2/2004 | Sims et al. | |
| 6,716,587 B2 | 4/2004 | Mosley et al. | |
| 6,740,522 B2 | 5/2004 | Anderson | |
| 6,849,450 B2 | 2/2005 | Langley et al. | |
| 6,924,360 B2 | 8/2005 | Green et al. | |
| 7,037,498 B2 | 5/2006 | Cohen et al. | |
| 7,045,128 B2 | 5/2006 | Lyman et al. | |
| 7,067,131 B2 | 6/2006 | Gudas et al. | |
| 7,081,523 B2 | 7/2006 | Elliott | |
| 7,084,257 B2 | 8/2006 | Deshpande et al. | |
| 7,090,844 B2 | 8/2006 | Bar-Eli et al. | |
| 7,109,003 B2 | 9/2006 | Hanson et al. | |
| 7,132,281 B2 | 11/2006 | Hanson et al. | |
| 7,135,174 B2 | 11/2006 | Corvalan et al. | |
| 7,138,500 B1 | 11/2006 | Goodwin et al. | |
| 7,141,653 B2 | 11/2006 | Greenfeder et al. | |
| 7,144,731 B2 | 12/2006 | Zsebo et al. | |
| 7,186,809 B2 | 3/2007 | Pluenneke | |
| 7,193,058 B2 | 3/2007 | Cosman et al. | |
| 7,199,224 B2 | 4/2007 | Black et al. | |
| 7,202,343 B2 | 4/2007 | Gudas et al. | |
| 7,265,212 B2 | 9/2007 | Babcook et al. | |
| 7,267,960 B2 | 9/2007 | Galibert et al. | |
| 7,270,817 B2 | 9/2007 | Sims et al. | |

(Continued)

FOREIGN PATENT DOCUMENTS

| EP | 3128319 A1 | 2/2017 |
| WO | 2008/052030 A2 | 5/2008 |

(Continued)

OTHER PUBLICATIONS

Agarabi et al., "Bioreactor Process Parameter Screening Utilizing a Plackett-Burman Design for a Model Monoclonal Antibody," *Journal of Pharmaceutical Sciences* 104: 1919-1928 (2015).

Aghamohseni et al., "Effects of nutrient levels and average culture pH on the glycosylation pattern of camelid-humanized monoclonal antibody," *Journal of Biotechnology* 186: 98-109 (2014).

Ahn et al., "Effect of Culture Temperature on Erythropoietin Production and Glycosylation in a Perfusion Culture of Recombinant CHO Cells," *Biotechnology and Bioengineering* 101(6): 1234-1244 (2008).

Brunner et al., "Investigation of the interactions of critical scale-up parameters (pH, pO$_2$ and pCO$_2$) on CHO batch performance and critical quality attributes," *Bioprocess Biosyst Eng* 40: 251-263 (2017).

(Continued)

*Primary Examiner* — Ruixiang Li
(74) *Attorney, Agent, or Firm* — Julie J. Hong

(57) ABSTRACT

Provided herein are methods of modulating the levels of total afucosylated (TAF) glycoforms of a recombinant glycosylated protein produced by glycosylation-competent cells in a cell culture. In exemplary embodiments, the methods comprise maintaining the cell culture at an initial set point pH for an initial cell culture period. Related compositions comprising glycosylated proteins and TAF glycoforms thereof are also provided herein.

18 Claims, 8 Drawing Sheets

(56) References Cited

U.S. PATENT DOCUMENTS

| | | |
|---|---|---|
| 7,285,269 B2 | 10/2007 | Babcook et al. |
| 7,288,251 B2 | 10/2007 | Bedian et al. |
| 7,288,253 B2 | 10/2007 | Roskos et al. |
| 7,304,144 B2 | 12/2007 | Sims et al. |
| 7,317,090 B2 | 1/2008 | Mosley et al. |
| 7,318,925 B2 | 1/2008 | Roskos et al. |
| 7,326,414 B2 | 2/2008 | Bedian et al. |
| 7,335,743 B2 | 2/2008 | Welcher et al. |
| 7,338,660 B2 | 3/2008 | Bedian et al. |
| 7,371,381 B2 | 5/2008 | Aaron et al. |
| 7,378,091 B2 | 5/2008 | Gudas et al. |
| 7,411,050 B2 | 8/2008 | Anderson |
| 7,411,057 B2 | 8/2008 | Hanson et al. |
| 7,422,742 B2 | 9/2008 | Greenfeder et al. |
| 7,423,128 B2 | 9/2008 | Gazit-Bornstein et al. |
| 7,427,669 B2 | 9/2008 | Cosman et al. |
| 7,429,491 B2 | 9/2008 | Luan et al. |
| 7,435,796 B1 | 10/2008 | Yoshinaga |
| 7,438,910 B2 | 10/2008 | Varnum et al. |
| 7,449,555 B2 | 11/2008 | Fanslow, III et al. |
| 7,465,450 B2 | 12/2008 | Pluenneke |
| 7,498,420 B2 | 3/2009 | Michaud et al. |
| 7,521,048 B2 | 4/2009 | Gliniak et al. |
| 7,521,053 B2 | 4/2009 | Oliner |
| 7,537,762 B2 | 5/2009 | North et al. |
| 7,541,438 B2 | 6/2009 | Tamatani et al. |
| 7,563,442 B2 | 7/2009 | Bedian et al. |
| 7,566,772 B2 | 7/2009 | Green et al. |
| 7,569,387 B2 | 8/2009 | Theill et al. |
| 7,579,186 B1 | 8/2009 | Sakamoto et al. |
| 7,585,500 B2 | 9/2009 | Foltz et al. |
| 7,592,429 B2 | 9/2009 | Paszty et al. |
| 7,592,430 B2 | 9/2009 | Bedian et al. |
| 7,601,818 B2 | 10/2009 | Wild, Jr. et al. |
| 7,618,633 B2 | 11/2009 | Bedian et al. |
| 7,626,012 B2 | 12/2009 | Bedian et al. |
| 7,628,986 B2 | 12/2009 | Weber et al. |
| 7,638,606 B2 | 12/2009 | Carter et al. |
| 7,658,924 B2 | 2/2010 | Oliner et al. |
| 7,695,948 B2 | 4/2010 | Black et al. |
| 7,700,742 B2 | 4/2010 | Cohen et al. |
| 7,704,501 B2 | 4/2010 | Anderson |
| 7,705,130 B2 | 4/2010 | Rothe et al. |
| 7,709,611 B2 | 5/2010 | Li et al. |
| 7,718,776 B2 | 5/2010 | Boyle et al. |
| 7,728,110 B2 | 6/2010 | Babcook et al. |
| 7,728,113 B2 | 6/2010 | Bedian et al. |
| 7,736,644 B2 | 6/2010 | Weber et al. |
| 7,741,115 B2 | 6/2010 | Baum et al. |
| 7,767,206 B2 | 8/2010 | Tocker et al. |
| 7,767,793 B2 | 8/2010 | Sims |
| 7,786,271 B2 | 8/2010 | Sims et al. |
| 7,786,284 B2 | 8/2010 | Tocker et al. |
| 7,790,859 B2 | 9/2010 | Welcher et al. |
| 7,795,413 B2 | 9/2010 | Wild, Jr. et al. |
| 7,807,159 B2 | 10/2010 | Chin et al. |
| 7,807,795 B2 | 10/2010 | Boyle |
| 7,807,796 B2 | 10/2010 | Cosman et al. |
| 7,807,797 B2 | 10/2010 | Hanson et al. |
| 7,807,798 B2 | 10/2010 | Jakobovits et al. |
| 7,815,907 B2 | 10/2010 | Cohen et al. |
| 7,824,679 B2 | 11/2010 | Hanson et al. |
| 7,833,527 B2 | 11/2010 | Tocker et al. |
| 7,867,494 B2 | 1/2011 | Liu et al. |
| 7,868,140 B2 | 1/2011 | Siu et al. |
| 7,871,611 B2 | 1/2011 | Calzone et al. |
| 7,872,106 B2 | 1/2011 | Paszty et al. |
| 7,872,113 B2 | 1/2011 | Carter et al. |
| 7,879,323 B2 | 2/2011 | Thomason et al. |
| 7,887,799 B2 | 2/2011 | Thomason et al. |
| 7,888,482 B2 | 2/2011 | Virca et al. |
| 7,906,625 B2 | 3/2011 | Shen et al. |
| 7,915,391 B2 | 3/2011 | Ng et al. |
| 7,923,008 B2 | 4/2011 | Boyle |
| 7,932,372 B2 | 4/2011 | Pullen et al. |
| 7,939,070 B2 | 5/2011 | Tocker et al. |
| 7,939,640 B2 | 5/2011 | Baum |
| 7,947,809 B2 | 5/2011 | Yan et al. |
| 7,964,193 B2 | 6/2011 | Green et al. |
| 2003/0103978 A1 | 6/2003 | Deshpande et al. |
| 2006/0127393 A1 | 6/2006 | Li et al. |
| 2007/0196376 A1 | 8/2007 | Raeber et al. |
| 2008/0166352 A1 | 7/2008 | Siu et al. |
| 2008/0182976 A1 | 7/2008 | Elliott |
| 2008/0286284 A1 | 11/2008 | Maddon et al. |
| 2008/0292639 A1 | 11/2008 | Shen et al. |
| 2009/0041784 A1 | 2/2009 | Yan et al. |
| 2009/0155164 A1 | 6/2009 | Brasel et al. |
| 2009/0155274 A1 | 6/2009 | Wild, Jr. et al. |
| 2009/0191212 A1 | 7/2009 | Oliner et al. |
| 2009/0208489 A1 | 8/2009 | Veiby et al. |
| 2009/0214559 A1 | 8/2009 | Varnum et al. |
| 2009/0226447 A1 | 9/2009 | Boone et al. |
| 2009/0234106 A1 | 9/2009 | Han et al. |
| 2009/0238823 A1 | 9/2009 | Comeau et al. |
| 2009/0263383 A1 | 10/2009 | Smothers et al. |
| 2010/0040619 A1 | 2/2010 | Li et al. |
| 2010/0047253 A1 | 2/2010 | Foltz et al. |
| 2010/0098694 A1 | 4/2010 | Bedian et al. |
| 2010/0111979 A1 | 5/2010 | Weber et al. |
| 2010/0166741 A1 | 7/2010 | Kelley et al. |
| 2010/0197005 A1 | 8/2010 | Belouski et al. |
| 2010/0209435 A1 | 8/2010 | Boyle et al. |
| 2010/0254975 A1 | 10/2010 | Hsu et al. |
| 2010/0255538 A1 | 10/2010 | Cohen et al. |
| 2010/0305307 A1 | 12/2010 | Jakobovits et al. |
| 2011/0014201 A1 | 1/2011 | Smith et al. |
| 2011/0027287 A1 | 2/2011 | Jackson et al. |
| 2011/0040076 A1 | 2/2011 | Wild, Jr. et al. |
| 2011/0044986 A1 | 2/2011 | Biere-Citron et al. |
| 2011/0045537 A1 | 2/2011 | Welcher et al. |
| 2011/0059063 A1 | 3/2011 | Virca et al. |
| 2011/0091455 A1 | 4/2011 | Chin et al. |
| 2011/0135657 A1 | 6/2011 | Hu et al. |
| 2011/0150888 A1 | 6/2011 | Foltz et al. |
| 2011/0165171 A1 | 7/2011 | Virca et al. |
| 2014/0356910 A1 | 12/2014 | Huang et al. |
| 2015/0376647 A1 | 12/2015 | Auslaender et al. |

FOREIGN PATENT DOCUMENTS

| | | |
|---|---|---|
| WO | 2008/063776 A2 | 5/2008 |
| WO | 2011/019622 A1 | 2/2011 |
| WO | 2011/127322 A1 | 10/2011 |
| WO | 2013/114164 A1 | 8/2013 |
| WO | 2013/114167 A1 | 8/2013 |
| WO | 2013/114245 A1 | 8/2013 |
| WO | 2013/114248 A1 | 8/2013 |
| WO | 2014/159488 A1 | 10/2014 |
| WO | 2015/011660 A1 | 1/2015 |
| WO | 2015/128314 A1 | 9/2015 |
| WO | 2015/128793 A1 | 9/2015 |
| WO | 2015/128795 A1 | 9/2015 |
| WO | 2015/140700 A1 | 9/2015 |
| WO | 2016/089919 A1 | 6/2016 |

OTHER PUBLICATIONS

Field et al., "Structural analysis of the N-glycans from human immunoglobulin A1: comparison of normal human serum immunoglobulin A1 with that isolated from patients with rheumatoid arthritis," *Biochem J* 299(1): 261-275 (1994).

Frenzel et al. "Expression of recombinant antibodies," *Frontiers in Immunology* 4: 1-20 (2013).

Gaillet et al., "High-Level Recombinant Protein Production in CHO Cells Using an Adenoviral Vector and the Cumate Gene-Switch," *Biotechnol. Prog.* 23: 200-209 (2007).

Ganguly et al., The CD25-binding antibody Daclizumab High-Yield Process has a distinct glycosylation pattern and reduced antibody-dependent cell-mediated cytotoxicity in comparison to Zenapax® *mAbs* 8(7): 1417-1424 (2016).

(56) References Cited

OTHER PUBLICATIONS

Gawlitzek et al., "Identification of Cell Culture Conditions to Control N-Glycosylation Site-Occupancy of Recombinant Glycoproteins Expressed in CHO Cells," *Biotechnology and Bioengineering* 103(6): 1164-1175 (2009).
Ge et al., "Validation of an optical sensor-based high-throughput bioreactor system for mammalian cell culture," *Journal of Biotechnology* 122(3): 293-306 (2006).
Goetze et al., "High-mannose glycans on the Fc region of therapeutic IgG antibodies increase serum clearance in humans," *Glycobiology* 21(7): 949-959 (2011).
Guile et al., "A Rapid High-Resolution High-Performance Liquid Chromatographic Method for Separating Glycan Mixtures and Analyzing Oligosaccharide Profiles," *Analytical Biochemistry* 240: 210-226 (1996).
Hayes et al., "Glycosylation and Fc Receptors," *Current Topics in Microbiology and Immunology* 382: 165-199 (2014).
Hermann et al., "Characterization of Gas-Liquid Mass Transfer Phenomena in Microtiter Plates," *Biotechnol. Bioeng*; . 81(2): 178-186 (2003).
Hodoniczky et al., "Control of Recombinant Monoclonal Antibody Effector Functions by Fc N-Glycan Remodeling in Vitro," *Biotechnol. Prog.* 21(6): 1644-1652 (2005).
Huang et al., "A Robust Method for Increasing Fc Glycan High Mannose Level of Recombinant Antibodies," *Biotechnology and Bioengineering* 112(6):1200-1209 (2015).
Imai-Nishiya et al., "Double knockdown of al, 6-fucosyltransferase (FUT8) and GDP-mannose 4,6-dehydratase (GMD) in antibody-producing cells: a new strategy for generating fully non-fucosylated therapeutic antibodies with enhanced ADCC," *BMC Biotechnology* 7: 84 (2007).
Ivarsson et al., "Evaluating the impact of cell culture process parameters on monoclonal antibody N-glycosylation," *Journal of Biotechnology* 188: 88-96 (2014).
Kanda et al., "Comparison of biological activity among nonfucosylated therapeutic IgG1 antibodies with three different N-linked Fc oligosaccharides: the high-mannose, hybrid, and complex types," *Glycobiology* 17(1): 104-118 (2006).
Konno et al., "Fucose content of monoclonal antibodies can be controlled by culture medium osmolality for high antibody-dependent cellular cytotoxicity," *Cytotechnology* 64: 249-265 (2012).
Lee et al., "Hydrogel microarray for monitoring of pH and dissolved oxygen in cell culture media," *Proceedings of SPIE—The International Society for Optical Engineering* 6094: 0009-0015 (2006).
Lin et al., "A common glycan structure on immunoglobulin G for enhancement of effector functions," *PNAS* 112(34): 10611-10616 (2015).
Liu, "Antibody Glycosylation and Its Impact on the Pharmacokinetics and Pharmacodynamics of Monoclonal Antibodies and Fc-Fusion Proteins," *Journal of Pharmaceutical Sciences* 104: 1866-1884 (2015).
Maharbiz et al., "Microbioreactor Arrays with Parametric Control for High-Throughput Experimentation," *Biotechnology and Bioengineering* 85(4): 376-381 (2004).
Mattu et al. "The Glycosylation and Structure of Human Serum IgA1, Fab, and Fc Regions and the Role of N-Glycosylation on Fcα Receptor Interactions," *Journal of Biological Chemistry* 273(4): 2260-2272 (1998).
Nimmerjahn and Ravetch, "Divergent Immunoglobulin G Subclass Activity Through Selective Fc Receptor Binding," *Science* 310: 1510-1512 (2005).
Pacis et al., "Effects of Cell Culture Conditions on Antibody N-linked Glycosylation—What Affects High Mannose 5 Glycoform," *Biotechnology and Bioengineering* 108(10): 2348-2358 (2011).
Parsons et al., "Optimal Synthetic Glycosylation of a Therapeutic Antibody," *Angewandte Chemie* 128: 2407-2413 (2016).
Reusch and Tejada, "Fc glycans of therapeutic antibodies as critical quality attributes," *Glycobiology* 25(12): 1325-1334 (2015).
Ruhaak et al., "Glycan labeling strategies and their use in identification and quantification," *Analytical and Bioanalytical Chemistry* 397(8): 3457-3481 (2010).
Shields et al., "Lack of Fucose on Human IgG1 N-Linked Oligosaccharide Improves Binding to Human FcγRIII and Antibody-dependent Cellular Toxicity," *Journal of Biological Chemistry* 277(30): 26733-26740 (2002).
Shimamoto et al., "Peptibodies: A flexible alternative format to antibodies," mAbs 4(5): 586-591 (2012).
Shinkawa et al., "The Absence of Fucose but Not the Presence of Galactose or Bisecting N-Acetylglucosamine of Human IgG1 Complex-type Oligosaccharides Shows the Critical Role of Enhancing Antibody-dependent Cellular Cytotoxicity," *J Biol Chem* 278(5): 3466-3473 (2003).
Spiess et al., "Alternative molecular formats and therapeutic applications for bispecific antibodies," *Molecular Immunology* 67: 95-106 (2015).
Umaña et al., "Engineered glycoforms of an antineuro-blastoma IgG1 with optimized antibody-dependent cellular cytotoxic activity," *Nature Biotechnology* 17(2): 176-180 (1999).
Weiner, "Rituximab: Mechanism of Action," *Seminars in Hematology* 47(2): 115-123 (2010).
Weuster-Botz et al., "Methods and milliliter scale devices for high-throughput bioprocess design," *Bioprocess Biosyst. Eng.* 28(2): 109-119 (2005).
Wong et al., "Impact of Dynamic Online Fed-Batch Strategies on Metabolism, Productivity and N-Glycosylation Quality in CHO Cell Cultures," *Biotechnology and Bioengineering* 89(2): 164-177 (2005).
Yoo et al., "Differences in N-glycan structures found on recombinant IgA1 and IgA2 produced in murine myeloma and CHO cell lines," *mAbs* 2(3): 320-334 (2010).
Yu et al., "Production, characterization and pharmacokinetic properties of antibodies with N-linked Mannose-5 glycans," *mAbs* 4:475-487 (2012).
Zanzotto et al., "Membrane-Aerated Microbioreactor for High-Throughput Bioprocessing," *Biotechnol. Bioeng.* 87(2): 243-254 (2004).
Zheng et al., "Improved process robustness, product quality and biological efficacy of an anti-CD52 monoclonal antibody upon pH shift in Chinese hamster ovary cell perfusion culture," *Process Biochemistry* 65: 123-129 (2018).
Adami et al., "Development of a pH Sensor with Integrated Reference Electrode for Cell Culture Monitoring," *Lecture Notes in Electrical Engineering* 162: 481-485 (2014).
Khan, "Gene Expression in Mammalian Cells and its Applications," *Advanced Pharmaceutical Bulletin* 3(2): 257-263 (2013).
Stanley et al., N-Glycans—Essentials of Glycobiology, $2^{nd}$ ed., chapter 8, Cold Spring Harbor Laboratory Press, 2009, 19 pages.
Upton et al., "Orthogonal Assessment of Biotherapeutic Glycosylation: A Case Study Correlating N-Glycan Core Afucosylation of Herceptin with Mechanism of Action," *Analytical Chemistry* 88: 10259-10265 (2016).
Wuhrer et al., "Protein glycosylation analysis by liquid chromatography-mass spectrometry," *Journal of Chromatography B* 825(2): 124-133 (2005).
Zupke et al., "Real-Time Product Attribute Control to Manufacture Antibodies with Defined N-Linked Glycan Levels," *Biotechnol. Prog.* 31(5): 1433-1441 (2015).
Xie et al., "Elucidating the effects of pH shift on IgGl monoclonal antibody acidic charge variant levels in Chinese hamster ovary cell cultures," *Appl Microbiol Biotechnol* 100(24):10343-10353 (2016).

\* cited by examiner

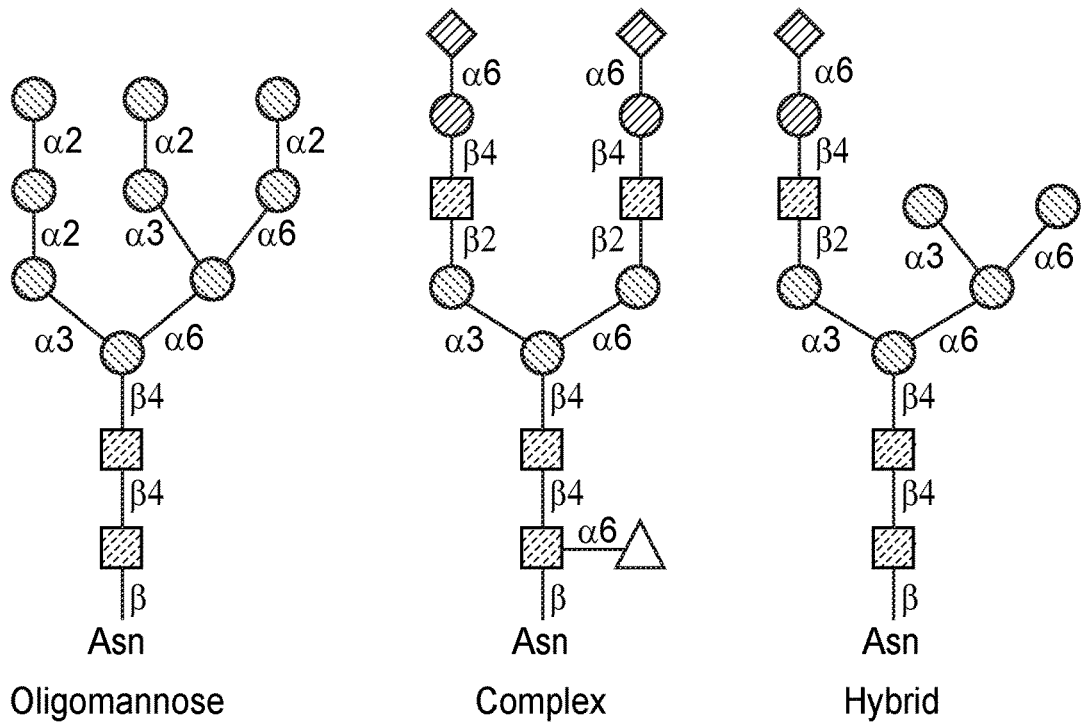

Symbolic Representations of Common Monosaccharides and Linkages

- ⊘ Galactose (Gal)
- ▨ N-Acetylgalactosamine (GalNAc)
- ⊠ Galactosamine (GalN)
- ⊙ Glucose (Glc)
- ▨ N-Acetylglucosamine (GlcNAc)
- ⊠ Glucosamine (GlcN)
- ● Mannose (Man)
- ▨ N-Acetylmannosamine (ManNAc)
- ⊠ Mannosamine (ManN)

- ☆ Xylose (Xyl)
- ◆ N-Acetylneuraminic (Neu5Ac)
- ◆ N-Glycolylneuraminic acid (Neu5Gc)
- ◆ 2-Keto-3-deoxynononic acid (Kdn)
- △ Fucose (Fuc)
- ◆ Glucuronic acid (GlcA)
- ◆ Iduronic acid (IdoA)
- ◆ Galacturonic acid (GalA)
- ◆ Mannuronic acid (ManA)

Other Monosaccharides
User letter designation inside symbol to specify if needed ⬡ Ⓐ

FIGURE 1

(A)
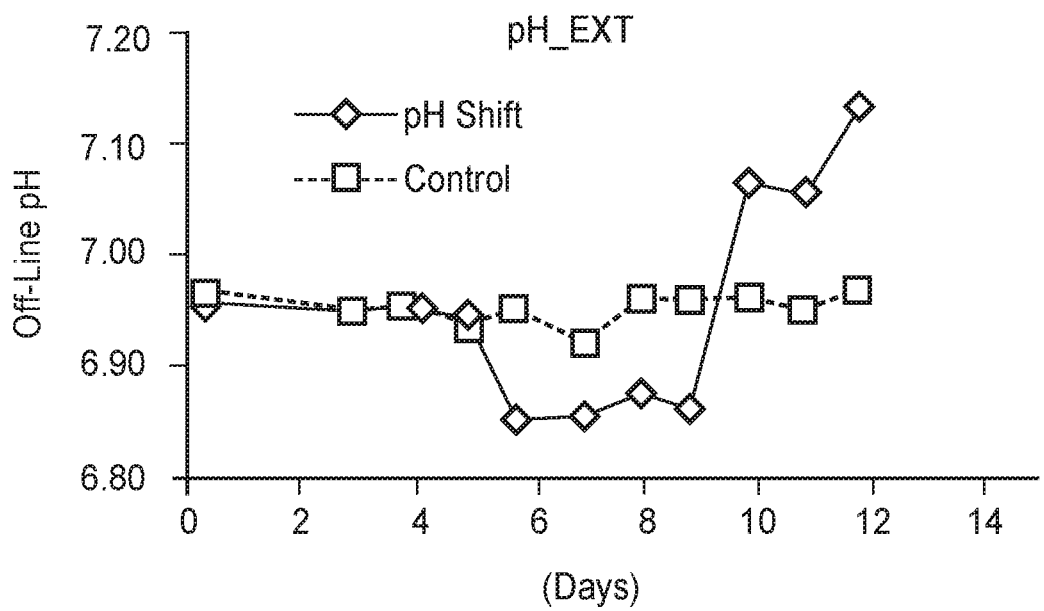
(B)
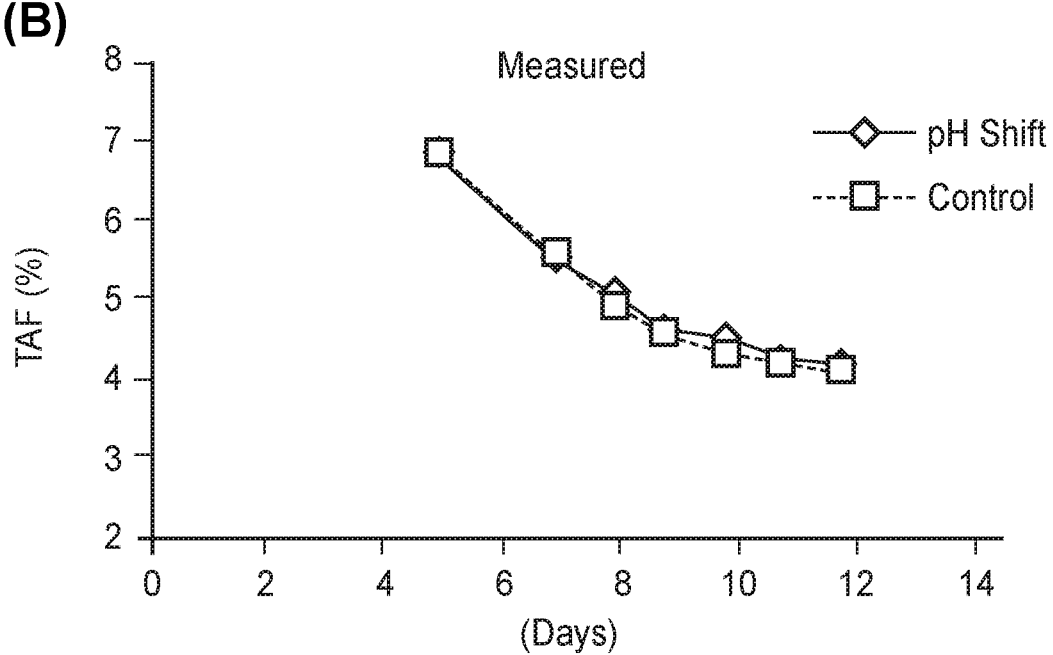
FIGURE 7

CONTROL OF TOTAL AFUCOSYLATED GLYCOFORMS OF ANTIBODIES PRODUCED IN CELL CULTURE

CROSS-REFERENCE TO RELATED APPLICATIONS

This application claims priority to U.S. Provisional Patent Application No. 62/471,347, filed on Mar. 14, 2017, the contents which are incorporated herein by reference.

BACKGROUND

Glycosylation is one of the most common, yet important, post-translational modifications, as it plays a role in multiple cellular functions, including, for example, protein folding, quality control, molecular trafficking and sorting, and cell surface receptor interaction. Glycosylation affects the therapeutic efficacy of recombinant protein drugs, as it influences the bioactivity, pharmacokinetics, immunogenicity, solubility, and in vivo clearance of a therapeutic glycoprotein. Fc glycoform profiles, in particular, are important product quality attributes for recombinant antibodies, as they directly impact the clinical efficacy and pharmacokinetics of the antibodies.

The high mannose (HM) glycoform content has been found to affect pharmacokinetic properties of certain therapeutic antibodies (Goetze, et al., (2011) Glycobiology 21, 949-59; Yu, et al., (2012) MAbs 4, 475-87). HM glycoforms not only influence the serum clearance rate of the antibodies, but such glycoforms, in addition to afucosylated (afuco) glycoforms, can impact antibody effector function or antibody-mediated target cell killing, also known as antibody-associated cellular cytotoxicity (ADCC).

Many factors influence the glycan structure and thus the ultimate glycosylated form (glycoform) of the protein. For example, the cell line expressing the antibody, the cell culture medium, the feed medium composition, and the timing of the feeds during cell culture can impact the production of glycoforms of the protein.

While research groups have suggested many ways to influence the levels of particular glycoforms of an antibody, there still is a need in the biopharmaceutical industry for simple and efficient methods to manipulate and control the levels of total afucosylated (TAF) glycoform during recombinant production of therapeutic antibodies.

SUMMARY

Described for the first time are data demonstrating that maintaining a desired initial pH (e.g., initial set point pH) during an initial cell culture period (e.g., the first 2, 3, 4, 5, or 6 days post-inoculation) is important to modulating the levels of TAF glycoforms of a recombinantly-produced glycosylated protein, whereas the cell culture pH after the initial cell culture period has minimum impact on TAF glycoform levels. The discovery that the initial pH, not late-stage pH, impacted TAF levels was unexpected. Without being bound to a particular theory, controlling the initial pH (e.g., initial set point pH) during the initial cell culture period (e.g., the first 2, 3, 4, 5, or 6 days post-inoculation) allows for recombinant production of a glycosylated protein having a desired or predetermined or pre-selected level of TAF glycoforms. Accordingly, the invention relates to methods of producing a recombinant glycosylated protein (glycoprotein) with desired or predetermined or pre-selected level of TAF glycoforms.

The invention provides methods of modulating the levels of TAF glycoforms of a recombinant glycosylated protein produced by glycosylation-competent cells in a cell culture. In exemplary embodiments, the methods comprise maintaining the cell culture at an initial pH, for example, an initial set point pH, for an initial cell culture period.

In exemplary aspects, the initial cell culture period is about 4 days to about 6 days, e.g., about 4 days, about 5 days, about 6 days, post-inoculation, or about 2 days to about 6 days post-inoculation, e.g. about 2 days, about 3 days, or about 48 hours to about 144 hours after inoculation, or 24 hours, 25 hours, 26 hours, 27 hours, 28 hours, 29 hours, 30 hours, 31 hours, 32 hours, 33 hours, 34 hours, 35 hours, 36 hours, 37 hours, 38 hours, 39 hours, 40 hours, 41 hours, 42 hours, 43 hours, 44 hours, 45 hours, 46 hours, 47 hours, 48 hours, 49 hours, 50 hours, 51 hours, 52 hours, 53 hours, 54 hours, 55 hours, 56 hours, 57 hours, 58 hours, 59 hours, 60 hours, 61 hours, 62 hours, 63 hours, 64 hours, 65 hours, 66 hours, 67 hours, 68 hours, 69 hours, 70 hours, 71 hours, 72 hours, 73 hours, 74 hours, 75 hours, 76 hours, 77 hours, 78 hours, 79 hours, 80 hours, 81 hours, 82 hours, 83 hours, 84 hours, 85 hours, 86 hours, 87 hours, 88 hours, 89 hours, 90 hours, 91 hours, 92 hours, 93 hours, 94 hours, 95 hours, 96 hours, 97 hours, 98 hours, 99 hours, 100 hours, 101 hours, 102 hours, 103 hours, 104 hours, 105 hours, 106 hours, 107 hours, 108 hours, 109 hours, 110 hours, 111 hours, 112 hours, 113 hours, 114 hours, 115 hours, 116 hours, 117 hours, 118 hours, 119 hours, 120 hours, 121 hours, 122 hours, 123 hours, 124 hours, 125 hours, 126 hours, 127 hours, 128 hours, 129 hours, 130 hours, 131 hours, 132 hours, 133 hours, 134 hours, 135 hours, 136 hours, 137 hours, 138 hours, 139 hours, 140 hours, 141 hours, 142 hours, 143 hours, 144 hours, 145 hours, 146 hours, 147 hours, 148 hours, 150 hours, 151 hours, 152 hours, 153 hours, 154 hours, 155 hours, 156 hours, 157 hours, 158 hours, 159 hours, 160 hours, 161 hours, 162 hours, 163 hours, 164 hours, 165 hours, 166 hours, 166 hours or increments thereof after inoculation.

In exemplary aspects, the initial cell culture period accords with a particular viable cell density (VCD) of the cell culture. In exemplary aspects, the initial cell culture period is the time after inoculation during which the cell culture has a VCD that is less than or about $6.5 \times 10^6$ cells per mL. In exemplary aspects, the method comprises maintaining the cell culture at the initial set point pH until the cell culture reaches a VCD of about $6.5 \times 10^6$ cells per mL. In exemplary aspects, the method comprises maintaining the cell culture at the initial set point pH until the cell culture reaches a VCD between about $6.9 \times 10^6$ and about $8.2 \times 10^6$. In exemplary aspects, the method comprises maintaining the cell culture at the initial set point pH until the cell culture reaches a VCD between about $8.2 \times 10^6$ and about $1.94 \times 10^7$. In exemplary aspects, the method comprises maintaining the cell culture at the initial set point pH until the cell culture reaches a VCD between about $1.21 \times 10^7$ and about $3.46 \times 10^7$.

In exemplary aspects, the initial set point pH is selected from a pH that is greater than about 6.5 and less than about 7.5.

The invention also relates to compositions comprising glycosylated proteins and TAF glycoforms thereof.

BRIEF DESCRIPTION OF THE DRAWINGS

FIG. 1 is an illustration of the three types of N-glycans and commonly used symbols for such saccharides.

FIG. 7 is a pair of graphs of pH or % TAF as a function of time.

DETAILED DESCRIPTION

Many secreted proteins undergo post-translational glycosylation, a process by which sugar moieties (e.g., glycans, saccharides) are covalently attached to specific amino acids of a protein. In eukaryotic cells, two types of glycosylation reactions occur: (1) N-linked glycosylation, in which glycans are attached to the asparagine of the recognition sequence Asn-X-Thr/Ser, where "X" is any amino acid except proline, and (2) O-linked glycosylation in which glycans are attached to serine or threonine. Regardless of the glycosylation type (N-linked or O-linked), microheterogeneity of protein glycoforms exists due to the large range of glycan structures associated with each site (O or N).

All N-glycans have a common core sugar sequence: Man$\alpha$1-6(Man$\alpha$1-3)Man$\beta$1-4GlcNAc$\beta$1-4GlcNAc$\beta$1-Asn-X-Ser/Thr (Man$_3$GlcNAc$_2$Asn) and are categorized into one of three types: (A) a high mannose (HM) or oligomannose (OM) type, which consists of two N-acetylglucosamine (GalNAc) moieties and a large number (e.g., 5, 6, 7, 8 or 9) of mannose (Man) residues (B) a complex type, which comprises more than two GlcNAc moieties and any number of other sugar types or (C) a hybrid type, which comprises a Man residue on one side of the branch and GlcNAc at the base of a complex branch. FIG. 1 (taken from Stanley et al., Chapter 8: N-Glycans, Essentials of Glycobiology, 2$^{nd}$ ed., Cold Spring Harbor Laboratory Press; 2009) shows the three types of N-glycans.

Figure 2:
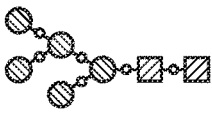
FIG. 2 is a table of exemplary glycan structures.

N-linked glycans typically comprise one or more monosaccharides of galactose (Gal), N-acetylgalactosamine (GalNAc), galactosamine (GalN), glucose (GLc), N-acetylglucoasamine (ClcNAc), glucoasamine (GlcN), mannose (Man), N-Acetylmannosamine (ManNAc), Mannosamine (ManN), xylose (Xyl), NOAcetylneuraminic acid (Neu5Ac), N-Glycolylneuraminic acid (Neu5Gc), 2-keto-3-doxynononic acid (Kdn), fucose (Fuc), Glucuronic acid (GLcA), Iduronic acid (IdoA), Galacturonic acid (Gal A), mannuronic acid (Man A). The commonly used symbols for such saccharides are shown in FIG. 1. Exemplary glycans and their identity are shown in FIG. 2.

N-linked glycosylation begins in the Endoplasmic Reticulum (ER), where a complex set of reactions result in the attachment of a core glycan structure made essentially of two GlcNAc residues and three Man residues. The glycan complex formed in the ER is modified by action of enzymes in the Golgi apparatus. If the saccharide is relatively inaccessible to the enzymes, it typically stays in the original HM form. If enzymes can access the saccharide, then many of the Man residues are cleaved off and the saccharide is further modified, resulting in the complex type N-glycans structure. For example, mannosidase-1 located in the cis-Golgi, can cleave or hydrolyze a HM glycan, while fucosyltransferase FUT-8, located in the medial-Golgi, fucosylates the glycan (Hanrue Imai-Nishiya (2007), BMC Biotechnology, 7:84).

Accordingly, the sugar composition and the structural configuration of a glycan structure varies, depending on the glycosylation machinery in the ER and the Golgi apparatus, the accessibility of the machinery enzymes to the glycan structure, the order of action of each enzyme and the stage at which the protein is released from the glycosylation machinery, among other factors.

The invention provided herein relates to methods of modulating levels of different glycosylated forms (glycoforms) of a protein during recombinant production by glycosylation-competent cells. Without being bound to a particular theory, it is believed that the methods of the invention provide a means for tailor-made compositions comprising specific amounts of particular glycoforms of a given recombinant protein.

In exemplary embodiments, the levels of total afucosylated (TAF) glycoforms are modulated. As used herein, "total afucosylated glycoforms" or "TAF glycoforms" or "TAF" or "final TAF" refers to the sum amount of high mannose glycoforms and afucosylated glycoforms. As used herein, the term "high mannose" or "HM" or "final HM" encompasses glycoforms comprising 5, 6, 7, 8, or 9 mannose residues, abbreviated as Man5, Man6, Man7, Man8, and Man9, respectively. As used herein, the term "afucosylated glycoform" or "afuco glycoform" or "afucosylated glycan" or "Afuco" or "AF" or "final afucosylated" refers to glycoforms which lack a core fucose, e.g., an $\alpha$1,6-linked fucose on the GlcNAc residue involved in the amide bond with the Asn of the N-glycosylation site. Afucosylated glycoforms include, but are not limited to, A1G0, A2G0, A2G1a, A2G1b, A2G2, and A1G1M5. Additional afucosylated glycans include, e.g., A1G1a, G0[H3N4], G0[H4N4], G0[H5N4], FO-N[H3N3]. See, e.g., Reusch and Tejada, Glycobiology 25(12): 1325-1334 (2015). In exemplary aspects, the level of TAF, amount of HM glycoforms and afucosylated glycoforms is determined via HILIC, as further described herein in Example 1. After enzyme cleavage of the N-glycans, HILIC is performed to obtain a chromatogram with several peaks, each peak of which represents a mean distribution (amount) of a different glycoform. For these purposes, % Peak Area=Peak Area/Total Peak Area×100%, and % Total Peak Area=Sample Total Area/Total Area of the Standard×100%. The calculations used for purposes of determining the % TAF may be carried out as follows:

% Afucosylated glycoforms=% A1G0+% A2G0+% A2G1a+% A2G1b+% A2G2+% A1G1M5.

% High mannose glycoforms=% Man5 (if detectable)+% Man6 (if detectable)+% Man7 (if detectable)+% Man8 (if detectable)+% Man9 (if detectable)

The invention provides a method of modulating the levels of TAF glycoforms of a recombinant glycosylated protein. In exemplary aspects, the recombinant glycosylated protein is produced by glycosylation-competent cells in a cell culture. In exemplary embodiments, the method comprises maintaining the cell culture at an initial set point pH for an initial cell culture period. As used herein, the term "maintaining" means setting the set point pH to an initial set point pH and not changing that set point pH during the indicated time period. As used herein, the term "set point pH" refers to a desired or target pH value as set by a user on a pH control system or instrument. As used herein, the term "initial set point pH" refers to a set point pH set by a user before, during, or immediately after inoculation of the cell culture. As one of ordinary skill in the art recognizes, a set point pH may differ from the actual pH of a cell culture, depending on the calibration limits of the particular pH control system. Typically, the actual pH of a cell culture will be ±0.05 of a set point pH and in some aspects, the actual pH of a cell culture will be ±0.03 or ±0.02 of a set point pH. In exemplary aspects, maintaining the cell culture at an initial set point pH for an initial cell culture period means that the pH of the cell culture does not shift by more than 0.05 from the initial set point pH during the initial cell culture period. In exemplary embodiments, the method comprises maintaining the cell culture at an initial set point pH for an initial cell culture period, wherein the initial set point pH is greater than about 6.5 and less than 7.5. For example, the initial set point pH is or is greater than 6.50, 6.52, 6.54, 6.56, 6.58, 6.60, 6.62, 6.64, 6.66, 6.68, 6.70, 6.72, 6.74, 6.76, 6.78, 6.80, 6.82, 6.84, 6.86, 6.88, 6.90, 7.10, 7.12, 7.14, 7.16, 7.18, 7.20, 7.22, 7.24, 7.26, 7.28, 7.30, 7.32, 7.34, 7.36, 7.38, 7.40, 7.42, 7.44, 7.46, 7.48, 7.50. For example, the initial set point pH is 6.50, 6.55, 6.60, 6.65, 6.70, 6.75, 6.80, 6.85, 6.90, 6.95, 7.0, 7.05, 7.10, 7.15, 7.20, 7.25, 7.30, 7.35, 7.40, 7.45, 7.50. In addition, the initial set point is or is less than 7.5. For example, the initial set point pH is or is less than 7.48, 7.46, 7.44, 7.42, 7.40, 7.38, 7.36, 7.34, 7.32, 7.30, 7.28, 7.26, 7.24, 7.22, 7.20, 7.18, 7.16, 7.14, 7.12, 7.10, 7.08, 7.06, 7.04, 7.02, 7.00, 6.98, 6.96, 6.94, 6.92, 6.90, 6.88, 6.86, 6.84, 6.82, 6.80, 6.78, 6.76, 6.74, 6.72, 6.70, 6.68, 6.66, 6.64, 6.62, 6.60, 6.58, 6.56, 6.54, 6.52, 6.50. In exemplary aspects, the initial set point pH is greater than about 6.55 and less than about 7.5. In exemplary aspects, the initial set point pH is greater than about 6.60 and less than about 7.5. In exemplary aspects, the initial set point pH is greater than about 6.65 and less than about 7.5. In exemplary aspects, the initial set point pH is greater than about 6.7 and less than about 7.5. In exemplary aspects, the initial set point pH is greater than about 6.75 and less than about 7.5. In exemplary aspects, the initial set point pH is greater than about 6.80 and less than about 7.5. In exemplary aspects, the initial set point pH is greater than about 6.5 and less than about 7.45. In exemplary aspects, the initial set point pH is greater than about 6.5 and less than about 7.4. In exemplary aspects, the initial set point pH is greater than about 6.5 and less than about 7.35. In exemplary aspects, the initial set point pH is greater than about 6.5 and less than about 7.3. In exemplary aspects, the initial set point pH is greater than about 6.5 and less than about 7.25. In exemplary aspects, the initial set point pH is greater than about 6.5 and less than about 7.2. In exemplary aspects, the initial set point pH is greater than about 6.5 and less than about 7.15. In exemplary aspects, the initial set point pH is greater than about 6.5 and less than about 7.1. In exemplary aspects, the initial set point pH is greater than about 6.85 and less than 7.2. In exemplary aspects, the initial set point pH is between about 7.0 and 7.1. The initial set point pH in exemplary aspects is greater than or about 6.85 to less than or about 6.95. In exemplary aspects, the initial set point pH is about 6.95 to 7.15.

In exemplary embodiments, the method comprises maintaining the cell culture at an initial set point pH for an initial cell culture period. As used herein, the phrase "initial cell culture period" refers to the time post-inoculation or the time subsequent to when glycosylation-competent cells were added to a cell culture medium for purposes of culturing the cells for recombinant protein production. In exemplary aspects, the initial cell culture period is about 4 days to about 6 days (e.g., about 4 days, 5 days, or about 6 days) or is about 96 hours to about 144 hours, or increments thereof. In exemplary aspects, the initial cell culture period is about 4 days to about 5 days. In exemplary aspects, the initial cell culture period is about 4 days. In exemplary embodiments, the initial cell culture period is defined in terms of a particular viable cell density (VCD) of the cell culture. In exemplary aspects, the initial cell culture period is the time after inoculation during which the cell culture has a VCD that is less than or about $6.5 \times 10^6$ cells per mL. In exemplary aspects, the method comprises maintaining the cell culture at the initial set point pH until the cell culture reaches a VCD of about $6.5 \times 10^6$ cells per mL. In exemplary aspects, the method comprises maintaining the cell culture at the initial set point pH until the cell culture reaches a VCD between about $8.2 \times 10^6$ and about $1.94 \times 10^7$. In exemplary aspects, the method comprises maintaining the cell culture at the initial set point pH until the cell culture reaches a VCD between about $1.21 \times 10^7$ and about $3.46 \times 10^7$.

In exemplary aspects, the initial pH is higher than a control pH of a control cell culture. Without being bound to a particular theory, maintaining a higher pH (relative to a control pH) leads to an increase in TAF glycoforms, relative to the control cell culture. Accordingly, in exemplary embodiments, the methods of the invention relate to increasing the levels of TAF glycoforms of a protein produced by cells in a cell culture. In exemplary aspects, the levels of HM glycoforms of the recombinant glycosylated protein are increased, relative to the control cell culture. In exemplary aspects, the levels of one or more of Man5, Man6, Man7, Man8, and/or Man9 of the recombinant glycosylated protein are increased, relative to the control cell culture. In exemplary aspects, the levels of afucosylated glycoforms of the recombinant glycosylated protein are increased, relative to the control cell culture. In exemplary aspects, the levels of one or more of A1G0, A2G0, A2G1a, A2G1b, A2G2, and A1G1M5 of the recombinant glycosylated protein are increased, relative to the control cell culture. In exemplary aspects, the levels of one or more of A1G1a, G0[H3N4], G0[H4N4], G0[H5N4], and F0-N[H3N3] of the recombinant glycosylated protein are increased, relative to the control cell culture.

As used herein, the term "increase" and words stemming therefrom may not be a 100% or complete increase. Rather, there are varying degrees of an increase of which one of ordinary skill in the art recognizes as having a potential benefit. In this respect, the methods of the invention may increase the TAF, HM, or afuco glycoform levels to any degree or level, relative a control cell culture. In exemplary embodiments, the increase provided by the methods of the invention is at least or about a 10% increase (e.g., at least or about a 20% increase, at least or about a 30% increase, at least or about a 40% increase, at least or about a 50% increase, at least or about a 60% increase, at least or about a 70% increase, at least or about a 80% increase, at least or about a 90% increase, at least or about a 95% increase, at least or about a 98% increase), relative a control cell culture. In exemplary embodiments, the increase provided by the methods of the invention is over 100%, e.g., 200%, 300%, 400%, 500%, 600%, 700%, 800%, 900% or even 1000% relative a control cell culture. In exemplary embodiments, the level of TAF, HM, or afuco glycoforms of the protein increases by at least about 1.5-fold, relative a control cell culture. In exemplary embodiments, the level of TAF, HM, or afuco glycoforms of the protein increases by at least about 2-fold, relative a control cell culture. In exemplary embodiments, the level of TAF, HM, or afuco glycoforms of the protein increases by at least about 3-fold, relative a control cell culture. In exemplary embodiments, the level of TAF, HM, or afuco glycoforms of the protein increases by at least about 4-fold or 5-fold, relative a control cell culture.

In exemplary aspects, the increased level of TAF glycoforms of the protein is observed or observable or detected or detectable as early as the $1^{st}$ day post-inoculation. In exemplary aspects, the increased level of TAF glycoforms of the protein is observed or observable or detected or detectable as early as the $2^{nd}$ day post-inoculation. In exemplary aspects, the increased level of TAF glycoforms of the protein is observed or observable or detected or detectable as early as the $3^{rd}$ day post-inoculation. In exemplary aspects, the increased level of TAF glycoforms of the protein is observed or observable or detected or detectable as early as the $4^{th}$ day post-inoculation. In exemplary aspects, the increased level of TAF glycoforms of the protein is observed or observable or detected or detectable after about the $5^{th}$ day post-inoculation. In exemplary aspects, the increased level of TAF glycoforms of the protein is observed or observable or detected or detectable at the time the protein is harvested from the cell culture.

In exemplary aspects, the increased level of TAF glycoforms of the protein is observed for longer than the $4^{th}$, $5^{th}$, or $6^{th}$ day of cell culture or beyond the initial cell culture period. In exemplary aspects, the increased level of TAF glycoforms of the protein is observed for 7, 8, 9, 10, 11 or 12 days of cell culture (post-inoculation), or longer (e.g., 2 weeks, 3 weeks, 4 weeks, 1 month, 2 months, 3 months, 6 months, 1 year). In exemplary aspects, the increased level of TAF glycoforms of the protein is observed at the time the protein is harvested from the cell culture.

In exemplary aspects, the initial pH is lower than a control pH of a control cell culture. Without being bound to a particular theory, maintaining a lower pH (relative to a control pH) leads to a decrease in TAF glycoforms, relative to the control cell culture. Accordingly, in exemplary embodiments, the methods of the invention relate to decreasing the levels of TAF glycoforms of a protein produced by cells in a cell culture. In exemplary aspects, the levels of HM glycoforms of the recombinant glycosylated protein are decreased, relative to the control cell culture. In exemplary aspects, the levels of one or more of Man5, Man6, Man7, Man8, and/or Man9 of the recombinant glycosylated protein are decreased, relative to the control cell culture. In exemplary aspects, the levels of afucosylated glycoforms of the recombinant glycosylated protein are decreased, relative to the control cell culture. In exemplary aspects, the levels of one or more of A1G0, A2G0, A2G1a, A2G1b, A2G2, and A1G1M5 of the recombinant glycosylated protein are decreased, relative to the control cell culture. In exemplary aspects, the levels of one or more of A1G1a, G0[H3N4], G0[H4N4], G0[H5N4], and F0-N[H3N3] of the recombinant glycosylated protein are decreased, relative to the control cell culture.

As used herein, the term "decrease" and words stemming therefrom may not be a 100% or complete decrease. Rather, there are varying degrees of a decrease of which one of ordinary skill in the art recognizes as having a potential benefit. In this respect, the methods of the invention may decrease the TAF, HM, or afuco glycoform levels to any degree or level relative a control cell culture. In exemplary embodiments, the decrease provided by the methods of the invention is at least or about a 10% decrease (e.g., at least or about a 20% decrease, at least or about a 30% decrease, at least or about a 40% decrease, at least or about a 50% decrease, at least or about a 60% decrease, at least or about a 70% decrease, at least or about a 80% decrease, at least or about a 90% decrease, at least or about a 95% decrease, at least or about a 98% decrease) relative a control cell culture. In exemplary embodiments, the decrease provided by the methods of the invention is over 100%, e.g., 200%, 300%, 400%, 500%, 600%, 700%, 800%, 900% or even 1000% relative a control cell culture. In exemplary embodiments, the level of TAF, HM, or afuco glycoforms of the protein decreases by at least about 1.5-fold, relative a control cell culture. In exemplary embodiments, the level of TAF, HM, or afuco glycoforms of the protein decreases by at least about 2-fold, relative a control cell culture. In exemplary embodiments, the level of TAF, HM, or afuco glycoforms of the protein decreases by at least about 3-fold, relative a control cell culture. In exemplary embodiments, the level of TAF, HM, or afuco glycoforms of the protein decreases by at least about 4-fold or 5-fold, relative a control cell culture.

In exemplary aspects, the decreased level of TAF glycoforms of the protein is observed or observable or detected or detectable as early as the $1^{st}$ day post-inoculation. In exemplary aspects, the decreased level of TAF glycoforms of the protein is observed or observable or detected or detectable as early as the $2^{nd}$ day post-inoculation. In exemplary aspects, the decreased level of TAF glycoforms of the protein is observed or observable or detected or detectable as early as the $3^{rd}$ day post-inoculation. In exemplary aspects, the decreased level of TAF glycoforms of the protein is observed or observable or detected or detectable as early as the $4^{th}$ day post-inoculation. In exemplary aspects, the decreased level of TAF glycoforms of the protein is observed or observable or detected or detectable after about the $5^{th}$ day post-inoculation. In exemplary aspects, the decreased level of TAF glycoforms of the protein is observed or observable or detected or detectable at the time the protein is harvested from the cell culture.

In exemplary aspects, the decreased level of TAF glycoforms of the protein is observed for longer than the $4^{th}$, $5^{th}$, or $6^{th}$ day of cell culture or beyond the initial cell culture period. In exemplary aspects, the decreased level of TAF glycoforms of the protein is observed for 7, 8, 9, 10, 11 or 12 days of cell culture (post-inoculation), or longer (e.g., 2 weeks, 3 weeks, 4 weeks, 1 month, 2 months, 3 months, 6 months, 1 year). In exemplary aspects, the decreased level of TAF glycoforms of the protein is observed at the time the protein is harvested from the cell culture.

With regard to the methods of the invention, the modulation, increase or decrease affected by such methods are relative to a "control" or a "control cell culture". The terms are used interchangeably herein. In exemplary aspects, the control is the level of TAF glycoforms of the protein when the steps of the inventive method are not carried out. In exemplary aspects, the control is the level of TAF glycoforms of the protein when a known method of recombinant production is carried out. In exemplary aspects, the control is the level of TAF glycoforms when a known operational pH is maintained during recombinant production. As used herein, the term "control cell culture" means a cell culture maintained in the same manner as the cell culture on which the steps of the inventive method are carried out (e.g., cell culture of the inventive method) except for the pH during the initial cell culture period. In exemplary aspects, the control cell culture is a cell culture maintained at known operational or standard parameters, including a control pH. As used herein, the term "control pH" may refer to a known operational pH, e.g., a pH of a cell culture maintained at a first time point or at a time point before carrying out the method of the invention. In exemplary aspects, a control pH is a pH of a cell culture for which the TAF levels are known or determined.

Various methods are known in the art for assessing glycoforms present in a glycoprotein containing composition or for determining a glycoform profile of a particular sample comprising glycoproteins. Suitable methods include, positive ion MALDI-TOF analysis, negative ion MALDI-TOF analysis, weak anion exchange (WAX) chromatography, normal phase chromatography (NP-HPLC), exoglycosidase digestion, Bio-Gel P-4 chromatography, anion-exchange chromatography and one-dimensional n.m.r. spectroscopy, and combinations thereof. See, e.g., Mattu et al., JBC 273: 2260-2272 (1998); Field et al., Biochem J 299(Pt 1): 261-275 (1994); Yoo et al., MAbs 2(3): 320-334 (2010) Wuhrer M. et al., Journal of Chromatography B, 2005, Vol. 825, Issue 2, pages 124-133; Ruhaak L. R., Anal Bioanal Chem, 2010, Vol. 397:3457-3481 and Geoffrey, R. G. et. al. Analytical Biochemistry 1996, Vol. 240, pages 210-226. Also, the examples set forth herein describe a suitable method for assessing glycoforms present in a glycoprotein containing composition.

Temperature and Other Cell Culture Parameters

In exemplary embodiments, the method further comprises maintaining the cell culture at an initial temperature during the initial cell culture period, and optionally during a second cell culture period which follows the initial cell culture period, wherein the initial temperature is between 30° C. and 40° C. In exemplary embodiments, the initial temperature is between about 32° C. to about 38° C. or between about 35° C. to about 38° C. In exemplary aspects, maintaining the cell culture at an initial temperature refers to maintaining the cell culture within ±1° C. of the initial temperature during the initial cell culture period. In exemplary aspects, maintaining the cell culture at an initial temperature for an initial cell culture period means that the temperature of the cell culture does not shift by more than 1° C. from the initial temperature during the initial cell culture period.

With regard to the invention, the cell culture may be maintained according to any set of conditions suitable for recombinant protein production. For example, the cell culture may be maintained at a particular cell density, culture volume, dissolved oxygen level, pressure, osmolality, and the like. In exemplary aspects, the cell culture prior to inoculation is shaken (e.g., at 70 rpm) at 5% $CO_2$ under standard humidified conditions in a $CO_2$ incubator. In exemplary aspects, the cell culture is inoculated with a seeding density of $10^6$ cells/mL in 1.5 L media. In exemplary aspects, the method comprises maintaining the osmolality between about 200 mOsm/kg to about 500 mOsm/kg. In exemplary aspects, the method comprises maintaining the osmolality between about 225 mOsm/kg to about 400 mOsm/kg or about 225 mOsm/kg to about 375 mOsm/kg. In exemplary aspects, the method comprises maintaining the osmolality between about 225 mOsm/kg to about 350 mOsm/kg. In exemplary aspects, the method comprises maintaining dissolved the oxygen (DO) level of the cell culture at about 20% to about 60% oxygen saturation during the initial cell culture period. In exemplary instances, the method comprises maintaining DO level of the cell culture at about 30% to about 50% (e.g., about 35% to about 45%) oxygen saturation during the initial cell culture period. In exemplary instances, the method comprises maintaining DO level of the cell culture at about 20%, about 30%, about 40%, about 50%, or about 60% oxygen saturation during the initial cell culture period.

The cell culture may be maintained in any one or more culture medium. In exemplary aspects, the cell culture may be maintained in a medium suitable for cell growth and/or may be provided with one or more feeding media according to any suitable feeding schedule. In exemplary aspects, the method comprises maintaining the cell culture in a medium comprising glucose, lactate, ammonia, glutamine, and/or glutamate. In exemplary aspects, the method comprises maintaining the cell culture in a medium comprising manganese at a concentration less than about 1 µM during the initial cell culture period. In exemplary aspects, the method comprises maintaining the cell culture in a medium comprising about 0.25 µM to about 1 µM manganese. In exemplary aspects, the method comprises maintaining the cell culture in a medium comprising negligible amounts of manganese. In exemplary aspects, the method comprises maintaining the cell culture in a medium comprising copper at a concentration less than or about 50 ppb during the initial cell culture period. In exemplary aspects, the method comprises maintaining the cell culture in a medium comprising copper at a concentration less than or about 40 ppb during the initial cell culture period. In exemplary aspects, the method comprises maintaining the cell culture in a medium comprising copper at a concentration less than or about 30 ppb during the initial cell culture period. In exemplary aspects, the method comprises maintaining the cell culture in a medium comprising copper at a concentration less than or about 20 ppb during the initial cell culture period. In exemplary aspects, the medium comprises copper at a concentration greater than or about 5 ppb or greater than or about 10 ppb.

In exemplary embodiments, the type of cell culture is a fed-batch culture or a continuous perfusion culture. However, the methods of the invention are advantageously not limited to any particular type of cell culture.

Post-Initial Cell Culture Period

In exemplary embodiments, the inventive methods of modulating TAF glycoform levels of a recombinant glycosylated protein comprises maintaining the cell culture at an initial pH for an initial cell culture period. In exemplary aspects, the method further comprises ceasing to maintain the cell culture at the initial set point pH after the initial cell culture period. For purposes herein, the concept of "ceasing to maintain the cell culture at the initial set point pH" refers to a halt in the actions required to control the cell culture at the initial set point pH. For example, one or more settings on the pH control system may be changed in order to effectively cease the maintenance of the initial set point pH. In exemplary aspects, "ceasing to maintain the cell culture at the initial set point pH" may refer to permitting a pH shift or change. For example, "ceasing to maintain the cell culture at the initial set point pH" may refer to an active step of shifting the pH by, e.g., changing the set point pH on a pH control system, or can refer to an inactive step of allowing the pH to shift or ceasing to control or maintain a particular pH or pH range. In exemplary aspects, the maintaining or adjusting of the cell culture pH ceases after the initial 4 to 6 days of cell culture. In exemplary aspects, the method of modulating TAF glycoform levels of a recombinant glycosylated protein produced by glycosylation-competent cells, comprises maintaining the cell culture at an initial pH for an initial cell culture period and ceasing to maintain the cell culture at the initial pH, after the initial cell culture period, and permitting the pH of the cell culture to shift, e.g., by more than 0.05. For purposes herein, the concept of "permitting the pH to shift" can refer to an active step of shifting the pH by, e.g., changing the set point pH on a pH control system, or can refer to an inactive step of allowing the pH to shift or ceasing to control or maintain a particular pH or pH range. In exemplary aspects, the cell culture pH is permitted to shift after the initial cell culture period by about 0.05 to about 2.0. For example, after the initial period of cell culture, the pH is permitted to shift by about 0.1 to about 1.5 or by about 0.5 to about 1.0. In certain exemplary aspects, the pH is never permitted to be outside the pH range which is suitable for antibody production by the cells of the cell culture. For example, the pH is never permitted to be at 9 or higher or 4 or lower.

In exemplary aspects, the method comprises a pH shift after the initial cell culture period. In exemplary aspects, the method comprises changing the set point pH on a pH control system from the initial set point pH to a different set point pH. In exemplary aspects, the method comprises shifting the pH (e.g., the set point pH) by more than about 0.05 (relative to the initial set point pH), after the initial cell culture period (optionally for a second cell culture period). In exemplary aspects, the method comprises shifting the pH (e.g., the set point pH) by about 0.05 to about 2.0 (relative to the initial set point pH), after the initial cell culture period. In exemplary aspects, the pH shift is an increase in pH (e.g., relative to the initial set point pH). In certain aspects, the method comprises increasing the pH (e.g., the set point pH) by about 0.1 to about 1.5 or by about 0.15 to about 1.0. In exemplary aspects, the shift is a decrease in pH (e.g., relative to the initial set point pH). In certain aspects, the method comprises decreasing the pH (e.g., the set point pH) by about 0.1 to about 1.5 or by about 0.15 to about 1.0.

Methods of controlling or maintaining the pH of a cell culture, as well as doing so with fully instrumented high-throughput bioreactors comprising pH monitoring systems, are known in the art. See, e.g., "Dissolved Oxygen and pH Monitoring within Cell Culture Media using a Hydrogel Microarray Sensor" Dissertation of Seung Joon Lee, December 2006 Texas A&M University; Adami et al., "Development of a pH Sensor with Integrated Reference Electrode for Cell Culture Monitoring" Sensors, Vol 162 Lecture Notes in Electrical Engineering, Chapter 86, pages 481-485 (2013); U.S. Pat. No. 7,429,491, Ge et al., J Biotechnology 122: 293-306 (2006); Weuster-Botz et al., Bioprocess. Biosyst. Eng. 28(2): 109-119 (2005); Maharbiz et al., Biotechnol. Bioeng. 85(4): 376-381 (2004); Zanzotto et al., Biotechnol. Bioeng. 87(2): 243-254 (2005); Hermann et al., Biotechnol. Bioeng. 81: 178-186 (2002); EP3128319; US2015/0376647. pH monitors are commercially available and include, e.g., Easyferm Plus ARC 225 (Hamilton, Reno, NV). Also, a method of maintaining a cell culture pH is described herein in the EXAMPLES.

In exemplary aspects, the inventive methods of modulating TAF glycoform levels of a recombinant glycosylated protein comprises maintaining the cell culture at an initial set point pH for an initial cell culture period and further comprises maintaining the cell culture at an initial temperature during the initial cell culture period, and optionally during a second cell culture period after the initial cell culture period, wherein the initial temperature is between 30° C. and 40° C. In exemplary aspects, the method further comprises maintaining the initial cell temperature during the initial cell culture period and at least 1, 2, 3, 4, 5, 6, 7, 8, 9, 10 or more days after the initial cell culture period. In exemplary aspects, the method further comprises ceasing to maintain the initial temperature after the initial cell culture period. In exemplary aspects, the method comprises ceasing to maintain the cell culture at the initial temperature and permitting the temperature to shift by about 2° C. or more after the initial cell culture period. In exemplary aspects, after the initial cell culture period, the temperature is permitted to shift by more than about 2° C. In exemplary aspects, the method comprises shifting the temperature by more than about 2° C. after the initial cell culture period. In any of the embodiments herein, the second cell culture period can be a further 1, 2, 3, 4, 5, 6, 7, 8, 9, 10, 11, 12, 13, or 14 days or longer after the initial cell culture period.

In exemplary aspects, the cell culture temperature is permitted to shift after the initial cell culture period. In exemplary aspects, after the initial cell culture period, the temperature is no longer maintained between ±1° C. of the selected initial temperature. In exemplary aspects, after the initial cell culture period, the temperature is permitted to shift by about 1° C. to about 6° C. For example, after the initial period of cell culture, the temperature is permitted to shift by about 1° C. to about 5° C. or by about 1° C. to about 4° C. or by about 2° C. or about 3° C. In certain exemplary aspects, the temperature is never permitted to be outside the temperature range which is suitable for antibody production by the cells of the cell culture. For example, the temperature is never permitted to be higher than 40° C. or lower than 30° C.

In exemplary aspects, the method comprises a temperature shift after the initial cell culture period. In exemplary aspects, the method comprises shifting the temperature by about 1° C. to about 6° C. after the initial 3 to 5 days of cell culture. In exemplary aspects, the shift is an increase in temperature. In exemplary aspects, the shift is a decrease in temperature. In certain aspects, the method comprises increasing or decreasing the temperature by about 1° C. to about 5° C. or by about 1° C. to about 4° C. or by about 2° C. or about 3° C. In exemplary aspects, the method comprises maintaining the cell culture at an initial pH, for example, an initial set point pH, for an initial cell culture period which is at least about 3 days, at least about 4 days, at least about 5 days, at least about 6 days, about 3 days to about 6 days, about 4 days to about 6 days, or about 4 days to about 5 days. In exemplary aspects, the method comprises maintaining the cell culture at an initial pH, for example, an initial set point pH, for an initial cell culture period which is at least about 72 hours, about 76 hours, about 80 hours, about 84 hours, about 88 hours, about 92 hours, about 96 hours, about 100 hours, about 104 hours, about 108 hours, about 112 hours, about 116 hours, about 120 hours, about 124 hours, about 128, about 132 hours, about 136 hours, about 140 hours, or about 144 hours.

In alternative embodiments, the method does not comprise a temperature shift after the initial cell culture period. In exemplary instances, the temperature of the cell culture is maintained for the entire duration of the cell culture period at a temperature that is within ±1° C. of the initial temperature. In exemplary instances, the temperature of the cell culture is maintained during the entire cell culture period at a temperature that is within ±1° C. of the initial temperature and the method comprises maintaining the cell culture at an initial pH, for example, an initial set point pH, for an initial cell culture period which is at least about 1 day, at least about 2 days, at least about 3 days, at least about 4 days, at least about 5 days, or at least about 6 days. In exemplary aspects, the temperature of the cell culture is maintained during the entire cell culture period at a temperature that is within ±1° C. of the initial temperature and the method comprises maintaining the cell culture at an initial pH, for example, an initial set point pH, for an initial cell culture period which is about 24 hours, about 28 hours, about 32 hours, about 36 hours, about 40 hours, about 44 hours, about 48 hours, about 52 hours, about 56 hours, about 60 hours, about 64 hours, about 68 hours, about 72 hours, about 76 hours, about 80 hours, about 84 hours, about 88 hours, about 92 hours, about 96 hours, about 100 hours, about 104 hours, about 108 hours, about 112 hours, about 116 hours, about 120 hours, about 124 hours, about 128, about 132 hours, about 136 hours, about 140 hours, or about 144 hours.

Recombinant Protein

In exemplary embodiments, the recombinant protein comprises an amino acid sequence comprising one or more N-glycosylation consensus sequences of the formula:

$$\text{Asn-Xaa}_1\text{-Xaa}_2$$

wherein $Xaa_1$ is any amino acid except Pro, and $Xaa_2$ is Ser or Thr.

In exemplary embodiments, the recombinant protein comprises a fragment crystallizable (Fc) polypeptide. The term "Fc polypeptide" as used herein includes native and mutein forms of polypeptides derived from the Fc region of an antibody. Truncated forms of such polypeptides containing the hinge region that promotes dimerization also are included. Fusion proteins comprising Fc moieties (and oligomers formed therefrom) offer the advantage of facile purification by affinity chromatography over Protein A or Protein G columns. In exemplary embodiments, the recombinant protein comprises the Fc of an IgG, e.g., a human IgG. In exemplary aspects, the recombinant protein comprises the Fc an IgG1 or IgG2. In exemplary aspects, the recombinant protein is an antibody, a peptibody, or a Fc-fusion protein.

In exemplary aspects, the recombinant glycosylated protein is an antibody. As used herein, the term "antibody" refers to a protein having a conventional immunoglobulin format, comprising heavy and light chains, and comprising variable and constant regions. For example, an antibody may be an IgG which is a "Y-shaped" structure of two identical pairs of polypeptide chains, each pair having one "light" (typically having a molecular weight of about 25 kDa) and one "heavy" chain (typically having a molecular weight of about 50-70 kDa). An antibody has a variable region and a constant region. In IgG formats, the variable region is generally about 100-110 or more amino acids, comprises three complementarity determining regions (CDRs), is primarily responsible for antigen recognition, and substantially varies among other antibodies that bind to different antigens. The constant region allows the antibody to recruit cells and molecules of the immune system. The variable region is made of the N-terminal regions of each light chain and heavy chain, while the constant region is made of the C-terminal portions of each of the heavy and light chains. (Janeway et al., "Structure of the Antibody Molecule and the Immunoglobulin Genes", Immunobiology: The Immune System in Health and Disease, 4$^{th}$ ed. Elsevier Science Ltd./Garland Publishing, (1999)).

The general structure and properties of CDRs of antibodies have been described in the art. Briefly, in an antibody scaffold, the CDRs are embedded within a framework in the heavy and light chain variable region where they constitute the regions largely responsible for antigen binding and recognition. A variable region comprises at least three heavy or light chain CDRs (Kabat et al., 1991, Sequences of Proteins of Immunological Interest, Public Health Service N.I.H., Bethesda, Md.; see also Chothia and Lesk, 1987, J. Mol. Biol. 196:901-917; Chothia et al., 1989, Nature 342: 877-883), within a framework region (designated framework regions 1-4, FR1, FR2, FR3, and FR4, by Kabat et al., 1991; see also Chothia and Lesk, 1987, supra).

Human light chains are classified as kappa and lambda light chains. Heavy chains are classified as mu, delta, gamma, alpha, or epsilon, and define the antibody's isotype as IgM, IgD, IgG, IgA, and IgE, respectively. IgG has several subclasses, including, but not limited to IgG1, IgG2, IgG3, and IgG4. IgM has subclasses, including, but not limited to, IgM1 and IgM2. Embodiments of the invention include all such classes or isotypes of antibodies. The light chain constant region can be, for example, a kappa- or lambda-type light chain constant region, e.g., a human kappa- or lambda-type light chain constant region. The heavy chain constant region can be, for example, an alpha-, delta-, epsilon-, gamma-, or mu-type heavy chain constant regions, e.g., a human alpha-, delta-, epsilon-, gamma-, or mu-type heavy chain constant region. Accordingly, in exemplary embodiments, the antibody is an antibody of isotype IgA, IgD, IgE, IgG, or IgM, including any one of IgG1, IgG2, IgG3 or IgG4.

The antibody may be a monoclonal antibody or a polyclonal antibody. In some embodiments, the antibody comprises a sequence that is substantially similar to a naturally-occurring antibody produced by a mammal, e.g., mouse, rabbit, goat, horse, chicken, hamster, human, and the like. In this regard, the antibody may be considered as a mammalian antibody, e.g., a mouse antibody, rabbit antibody, goat antibody, horse antibody, chicken antibody, hamster antibody, human antibody, and the like. In certain aspects, the recombinant protein is a human antibody. In certain aspects, the recombinant protein is a chimeric antibody or a humanized antibody. The term "chimeric antibody" is used herein to refer to an antibody containing constant domains from one species and the variable domains from a second, or more generally, containing stretches of amino acid sequence from at least two species. The term "humanized" when used in relation to antibodies refers to antibodies having at least CDR regions from a non-human source which are engineered to have a structure and immunological function more similar to true human antibodies than the original source antibodies. For example, humanizing can involve grafting CDR from a non-human antibody, such as a mouse antibody, into a human antibody. Humanizing also can involve select amino acid substitutions to make a non-human sequence look more like a human sequence.

An antibody can be cleaved into fragments by enzymes, such as, e.g., papain and pepsin. Papain cleaves an antibody to produce two Fab fragments and a single Fc fragment. Pepsin cleaves an antibody to produce a F(ab')$_2$ fragment and a pFc' fragment. In exemplary aspects, the recombinant glycosylated protein is an antibody fragment, e.g., a Fab, Fc, F(ab')$_2$, or a pFc', that retains at least one glycosylation site.

The architecture of antibodies has been exploited to create a growing range of alternative antibody formats that spans a molecular-weight range of at least 12-150 kDa and a valency (n) range from monomeric (n=1), dimeric (n=2) and trimeric (n=3) to tetrameric (n=4) and potentially higher; such alternative antibody formats are referred to herein as "antibody protein products".

Antibody protein products include those based on antibody fragments, e.g., scFvs, Fabs and VHH/VH, which retain full antigen-binding capacity. The smallest antigen-binding fragment that retains its complete antigen binding site is the Fv fragment, which consists entirely of variable (V) regions. A soluble, flexible amino acid peptide linker is used to connect the V regions to a scFv (single chain fragment variable) fragment for stabilization of the molecule, or the constant (C) domains are added to the V regions to generate a Fab fragment. Both scFv and Fab are widely used fragments that can be easily produced in prokaryotic hosts. Other antibody protein products include disulfide-bond stabilized scFv (ds-scFv), single chain Fab (scFab), as well as di- and multimeric antibody formats like dia-, tria- and tetra-bodies, or minibodies (miniAbs) that comprise different formats consisting of scFvs linked to oligomerization domains. The smallest fragments are VHH/VH of camelid heavy chain Abs as well as single domain Abs (sdAb). The building block that is most frequently used to create novel antibody formats is the single-chain variable (V)-domain antibody fragment (scFv), which comprises V domains from the heavy and light chain (VH and VL domain) linked by a peptide linker of ~15 amino acid residues. A peptibody or peptide-Fc fusion is yet another antibody protein product. The structure of a peptibody consists of a biologically active peptide grafted onto an Fc domain. Peptibodies are well-described in the art. See, e.g., Shimamoto et al., mAbs 4(5): 586-591 (2012).

Other antibody protein products include a single chain antibody (SCA); a diabody; a triabody; a tetrabody; bispecific or trispecific antibodies, and the like. Bispecific antibodies can be divided into five major classes: BsIgG, appended IgG, BsAb fragments, bispecific fusion proteins and BsAb conjugates. See, e.g., Spiess et al., Molecular Immunology 67(2) Part A: 97-106 (2015).

In exemplary aspects, the recombinant protein comprises any one of these antibody protein products. In exemplary aspects, the recombinant glycosylated protein is any one of an scFv, Fab VHH/VH, Fv fragment, ds-scFv, scFab, dimeric antibody, multimeric antibody (e.g., a diabody, triabody, tetrabody), miniAb, peptibody VHH/VH of camelid heavy chain antibody, sdAb, diabody; a triabody; a tetrabody; a bispecific or trispecific antibody, BsIgG, appended IgG, BsAb fragment, bispecific fusion protein, and BsAb conjugate.

The recombinant protein may be an antibody protein product in monomeric form, or polymeric, oligomeric, or multimeric form. In certain embodiments in which the antibody comprises two or more distinct antigen binding regions fragments, the antibody is considered bispecific, trispecific, or multi-specific, or bivalent, trivalent, or multivalent, depending on the number of distinct epitopes that are recognized and bound by the antibody.

With regard to the inventive methods, the antibody protein product may lack certain portions of an antibody. However, generally, the fragment will comprise at least a portion of the Fc region of an antibody which is glycosylated post-translationally in eukaryotic cells.

Advantageously, the methods are not limited to the antigen-specificity of the antibody. Accordingly, the antibody has any binding specificity for virtually any antigen. In exemplary aspects, the antibody binds to a hormone, growth factor, cytokine, a cell-surface receptor, or any ligand thereof. In exemplary aspects, the antibody binds to a protein expressed on the cell surface of an immune cell. In exemplary aspects, the antibody binds to a cluster of differentiation molecule selected from the group consisting of: CD1a, CD1b, CD1c, CD1d, CD2, CD3, CD4, CD5, CD6, CD7, CD8, CD9, CD10, CD11A, CD11B, CD11C, CDw12, CD13, CD14, CD15, CD15s, CD16, CDw17, CD18, CD19, CD20, CD21, CD22, CD23, CD24, CD25, CD26, CD27, CD28, CD29, CD30, CD31, CD32, CD33, CD34, CD35, CD36, CD37, CD38, CD39, CD40, CD41, CD42a, CD42b, CD42c, CD42d, CD43, CD44, CD45, CD45RO, CD45RA, CD45RB, CD46, CD47, CD48, CD49a, CD49b, CD49c, CD49d, CD49e, CD49f, CD50, CD51, CD52, CD53, CD54, CD55, CD56, CD57, CD58, CD59, CDw60, CD61, CD62E, CD62L, CD62P, CD63, CD64, CD65, CD66a, CD66b, CD66c, CD66d, CD66e, CD66f, CD68, CD69, CD70, CD71, CD72, CD73, CD74, CD75, CD76, CD79a, CD7913, CD80, CD81, CD82, CD83, CDw84, CD85, CD86, CD87, CD88, CD89, CD90, CD91, CDw92, CD93, CD94, CD95, CD96, CD97, CD98, CD99, CD100, CD101, CD102, CD103, CD104, CD105, CD106, CD107a, CD107b, CDw108, CD109, CD114, CD115, CD116, CD117, CD118, CD119, CD120a, CD120b, CD121a, CDw121b, CD122, CD123, CD124, CD125, CD126, CD127, CDw128, CD129, CD130, CDw131, CD132, CD134, CD135, CDw136, CDw137, CD138, CD139, CD140a, CD140b, CD141, CD142, CD143, CD144, CD145, CD146, CD147, CD148, CD150, CD151, CD152, CD153, CD154, CD155, CD156, CD157, CD158a, CD158b, CD161, CD162, CD163, CD164, CD165, CD166, and CD182.

In exemplary aspects, the antibody is one of those described in U.S. Pat. No. 7,947,809 and U.S. Patent Application Publication No. 20090041784 (glucagon receptor), U.S. Pat. Nos. 7,939,070, 7,833,527, 7,767,206, and 7,786,284 (IL-17 receptor A), U.S. Pat. Nos. 7,872,106 and 7,592,429 (Sclerostin), U.S. Pat. Nos. 7,871,611, 7,815,907, 7,037,498, 7,700,742, and U.S. Patent Application Publication No. 20100255538 (IGF-1 receptor), U.S. Pat. No. 7,868,140 (B7RP1), U.S. Pat. No. 7,807,159 and U.S. Patent Application Publication No. 20110091455 (myostatin), U.S. Pat. Nos. 7,736,644, 7,628,986, 7,524,496, and U.S. Patent Application Publication No. 20100111979 (deletion mutants of epidermal growth factor receptor), U.S. Pat. No. 7,728,110 (SARS coronavirus), U.S. Pat. No. 7,718,776 and U.S. Patent Application Publication No. 20100209435 (OPGL), U.S. Pat. Nos. 7,658,924 and 7,521,053 (Angiopoietin-2), U.S. Pat. Nos. 7,601,818, 7,795,413, U.S. Patent Application Publication No. 20090155274, U.S. Patent Application Publication No. 20110040076 (NGF), U.S. Pat. No. 7,579,186 (TGF-β type II receptor), U.S. Pat. No. 7,541,438 (connective tissue growth factor), U.S. Pat. No. 7,438,910 (IL1-R1), U.S. Pat. No. 7,423,128 (properdin), U.S. Pat. Nos. 7,411,057, 7,824,679, 7,109,003, 6,682,736, 7,132,281, and 7,807,797 (CTLA-4), U.S. Pat. Nos. 7,084,257, 7,790,859, 7,335,743, 7,084,257, and U.S. Patent Application Publication No. 20110045537 (interferon-gamma), U.S. Pat. No. 7,932,372 (MAdCAM), U.S. Pat. No. 7,906,625, U.S. Patent Application Publication No. 20080292639, and U.S. Patent Application Publication No. 20110044986 (amyloid), U.S. Pat. Nos. 7,815,907 and 7,700,742 (insulin-like growth factor I), U.S. Pat. Nos. 7,566,772 and 7,964,193 (interleukin-1β), U.S. Pat. Nos. 7,563,442, 7,288,251, 7,338,660, 7,626,012, 7,618,633, and U.S. Patent Application Publication No. 20100098694 (CD40), U.S. Pat. No. 7,498,420 (c-Met), U.S. Pat. Nos. 7,326,414, 7,592,430, and 7,728,113 (M-CSF), U.S. Pat. Nos. 6,924,360, 7,067,131, and 7,090,844 (MUC18), U.S. Pat. Nos. 6,235,883, 7,807,798, and U.S. Patent Application Publication No. 20100305307 (epidermal growth factor receptor), U.S. Pat. Nos. 6,716,587, 7,872,113, 7,465,450, 7,186,809, 7,317,090, and 7,638,606 (interleukin-4 receptor), U.S. Patent Application Publication No. 20110135657 (BETA-KLOTHO), U.S. Pat. Nos. 7,887,799 and 7,879,323 (fibroblast growth factor-like polypeptides), U.S. Pat. No. 7,867,494 (IgE), U.S. Patent Application Publication No. 20100254975 (ALPHA-4 BETA-7), U.S. Patent Application Publication No. 20100197005 and U.S. Pat. No. 7,537,762 (ACTIVIN RECEPTOR-LIKE KINASE-1), U.S. Pat. No. 7,585,500 and U.S. Patent Application Publication No. 20100047253 (IL-13), U.S. Patent Application Publication No. 20090263383 and U.S. Pat. No. 7,449,555 (CD148), U.S. Patent Application Publication No. 20090234106 (ACTIVIN A), U.S. Patent Application Publication No. 20090226447 (angiopoietin-1 and angiopoietin-2), U.S. Patent Application Publication No. 20090191212 (Angiopoietin-2), U.S. Patent Application Publicaiton No. 20090155164 (C-FMS), U.S. Pat. No. 7,537,762 (activin receptor-like kinase-1), U.S. Pat. No. 7,371,381 (galanin), U.S. Patent Application Publication No. 20070196376 (INSULIN-LIKE GROWTH FACTORS), U.S. Pat. Nos. 7,267,960 and 7,741,115 (LDCAM), U.S. Pat. No. 7,265,212 (CD45RB), U.S. Pat. No. 7,709,611, U.S. Patent Application Publication No. 20060127393 and U.S. Patent Application Publication No. 20100040619 (DKK1), U.S. Pat. No. 7,807,795, U.S. Patent Application Publication No. 20030103978 and U.S. Pat. No. 7,923,008 (osteoprotegerin), U.S. Patent Application Publication No. 20090208489 (OV064), U.S. Patent Application Publication No. 20080286284 (PSMA), U.S. Pat. No. 7,888,482, U.S. Patent Application Publication No. 20110165171, and U.S. Patent Application Publication No. 20110059063 (PAR2), U.S. Patent Application Publication No. 20110150888 (HEPCIDIN), U.S. Pat. No. 7,939,640 (B7L-1), U.S. Pat. No. 7,915,391 (c-Kit), U.S. Pat. Nos. 7,807,796, 7,193,058, and 7,427,669 (ULBP), U.S. Pat. Nos. 7,786,271, 7,304,144, and U.S. Patent Application Publication No. 20090238823 (TSLP), U.S. Pat. No. 7,767,793 (SIGIRR), U.S. Pat. No. 7,705,130 (HER-3), U.S. Pat. No. 7,704,501 (ataxin-1-like polypeptide), U.S. Pat. Nos. 7,695,948 and 7,199,224 (TNF-α converting enzyme), U.S. Patent Application Publication No. 20090234106 (ACTIVIN A), U.S. Patent Application Publication No. 20090214559 and U.S. Pat. No. 7,438,910 (IL1-R1), U.S. Pat. No. 7,579,186 (TGF-β type II receptor), U.S. Pat. No. 7,569,387 (TNF receptor-like molecules), U.S. Pat. No. 7,541,438, (connective tissue growth factor), U.S. Pat. No. 7,521,048 (TRAIL receptor-2), U.S. Pat. Nos. 6,319,499, 7,081,523, and U.S. Patent Application Publication No. 20080182976 (erythropoietin receptor), U.S. Patent Application Publication No. 20080166352 and U.S. Pat. No. 7,435,796 (B7RP1), U.S. Pat. No. 7,423,128 (properdin), U.S. Pat. Nos. 7,422,742 and 7,141,653 (interleukin-5), U.S. Pat. Nos. 6,740,522 and 7,411,050 (RANKL), U.S. Pat. No. 7,378,091 (carbonic anhydrase IX (CA IX) tumor antigen), U.S. Pat. Nos. 7,318,925 and 7,288,253 (parathyroid hormone), U.S. Pat. No. 7,285,269 (TNF), U.S. Pat. Nos. 6,692,740 and 7,270,817 (ACPL), U.S. Pat. No. 7,202,343 (monocyte chemoattractant protein-1), U.S. Pat. No. 7,144,731 (SCF), U.S. Pat. Nos. 6,355,779 and 7,138,500 (4-1BB), U.S. Pat. No. 7,135,174 (PDGFD), U.S. Pat. No. 6,630,143 and U.S. Pat. No. 7,045,128 (Flt-3 ligand), U.S. Pat. No. 6,849,450 (metalloproteinase inhibitor), U.S. Pat. No. 6,596,852 (LERK-5), U.S. Pat. No. 6,232,447 (LERK-6), U.S. Pat. No. 6,500,429 (brain-derived neurotrophic factor), U.S. Pat. No. 6,184,359 (epithelium-derived T-cell factor), U.S. Pat. No. 6,143,874 (neurotrophic factor NNT-1), U.S. Patent Application Publication No. 20110027287 (PROPROTEIN CONVERTASE SUBTILISIN KEXIN TYPE 9 (PCSK9)), U.S. Patent Application Publication No. 20110014201 (IL-18 RECEPTOR), and U.S. Patent Application Publication No. 20090155164 (C-FMS). The above patents and published patent applications are incorporated herein by reference in their entirety for purposes of their disclosure of variable domain polypeptides, variable domain encoding nucleic acids, host cells, vectors, methods of making polypeptides encoding said variable domains, pharmaceutical compositions, and methods of treating diseases associated with the respective target of the variable domain-containing antigen binding protein or antibody.

In exemplary embodiments, the antibody is one of Muromonab-CD3 (product marketed with the brand name Orthoclone Okt3®), Abciximab (product marketed with the brand name Reopro®), Rituximab (product marketed with the brand name MabThera®, Rituxan®), Basiliximab (product marketed with the brand name Simulect®), Daclizumab (product marketed with the brand name Zenapax®), Palivizumab (product marketed with the brand name Synagis®), Infliximab (product marketed with the brand name Remicade®), Trastuzumab (product marketed with the brand name Herceptin®), Alemtuzumab (product marketed with the brand name MabCampath®, Campath-1H®), Adalimumab (product marketed with the brand name Humira®), Tositumomab-I131 (product marketed with the brand name Bexxar®), Efalizumab (product marketed with the brand name Raptiva®), Cetuximab (product marketed with the brand name Erbitux®), l'Ibritumomab tiuxetan (product marketed with the brand name Zevalin®), l'Omalizumab (product marketed with the brand name Xolair®), Bevacizumab (product marketed with the brand name Avastin®), Natalizumab (product marketed with the brand name Tysabri®), Ranibizumab (product marketed with the brand name Lucentis®), Panitumumab (product marketed with the brand name Vectibix®), l'Eculizumab (product marketed with the brand name Soliris®), Certolizumab pegol (product marketed with the brand name Cimzia®), Golimumab (product marketed with the brand name Simponi®), Canakinumab (product marketed with the brand name Ilarise), Catumaxomab (product marketed with the brand name Removab®), Ustekinumab (product marketed with the brand name Stelara®), Tocilizumab (product marketed with the brand name RoActemra®, Actemra®), Ofatumumab (product marketed with the brand name Arzerra®), Denosumab (product marketed with the brand name Prolia®), Belimumab (product marketed with the brand name Benlysta®), Raxibacumab, Ipilimumab (product marketed with the brand name Yervoy®), and Pertuzumab (product marketed with the brand name Perjeta®). In exemplary embodiments, the antibody is one of anti-TNF alpha antibodies such as adalimumab, infliximab, etanercept, golimumab, and certolizumab pegol; anti-IL1.beta. antibodies such as canakinumab; anti-IL12/23 (p40) antibodies such as ustekinumab and briakinumab; and anti-IL2R antibodies, such as daclizumab. Examples of suitable anti-cancer antibodies include, but are not limited to, anti-BAFF antibodies such as belimumab; anti-CD20 antibodies such as rituximab; anti-CD22 antibodies such as epratuzumab; anti-CD25 antibodies such as daclizumab; anti-CD30 antibodies such as iratumumab, anti-CD33 antibodies such as gemtuzumab, anti-CD52 antibodies such as alemtuzumab; anti-CD152 antibodies such as ipilimumab; anti-EGFR antibodies such as cetuximab; anti-HER2 antibodies such as trastuzumab and pertuzumab; anti-IL6 antibodies such as siltuximab; and anti-VEGF antibodies such as bevacizumab; anti-IL6 receptor antibodies such as tocilizumab.

Cells

The invention relates to methods of modulating levels of different glycosylated forms of a protein during production by glycosylation-competent cells. In exemplary aspects, the glycosylation-competent cells are eukaryotic cells, including, but not limited to, yeast cells, filamentous fungi cells, protozoa cells, algae cells, insect cells, or mammalian cells. Such host cells are described in the art. See, e.g., Frenzel, et al., *Front Immunol* 4: 217 (2013). In exemplary aspects, the eukaryotic cells are mammalian cells. In exemplary aspects, the mammalian cells are non-human mammalian cells. In some aspects, the cells are Chinese Hamster Ovary (CHO)

cells and derivatives thereof (e.g., CHO-K1, CHO pro-3), mouse myeloma cells (e.g., NS0, GS-NS0, Sp2/0), cells engineered to be deficient in dihydrofolatereductase (DHFR) activity (e.g., DUKX-X11, DG44), human embryonic kidney 293 (HEK293) cells or derivatives thereof (e.g., HEK293T, HEK293-EBNA), green African monkey kidney cells (e.g., COS cells, VERO cells), human cervical cancer cells (e.g., HeLa), human bone osteosarcoma epithelial cells U2-OS, adenocarcinomic human alveolar basal epithelial cells A549, human fibrosarcoma cells HT1080, mouse brain tumor cells CAD, embryonic carcinoma cells P19, mouse embryo fibroblast cells NIH 3T3, mouse fibroblast cells L929, mouse neuroblastoma cells N2a, human breast cancer cells MCF-7, retinoblastoma cells Y79, human retinoblastoma cells SO-Rb50, human liver cancer cells Hep G2, mouse B myeloma cells J558L, or baby hamster kidney (BHK) cells (Gaillet et al. 2007; Khan, Adv Pharm Bull 3(2): 257-263 (2013)).

In exemplary aspects, the glycosylation-competent cells are eukaryotic cells. In exemplary aspects, the eukaryotic cells are mammalian cells. In some aspects, the mammalian cells are non-human mammalian cells. In exemplary aspects, the non-human mammalian cells are selected from the group consisting of: CHO cells, CHO derivatives (e.g., CHO-K1, CHO pro-3), mouse myeloma cells (e.g., NS0, GS-NS0, Sp2/0), cells engineered to be deficient in dihydrofolatereductase (DHFR) activity (e.g., DUKX-X11, DG44), green African monkey kidney cells (e.g., COS cells, VERO cells), mouse brain tumor cells CAD, mouse embryo fibroblast cells NIH 3T3, mouse fibroblast cells L929, mouse neuroblastoma cells N2a, human breast cancer cells MCF-7, retinoblastoma cells Y79, human retinoblastoma cells SO-Rb50, human liver cancer cells Hep G2, mouse B myeloma cells J558L, or baby hamster kidney (BHK) cells. Cells that are not glycosylation-competent can also be transformed into glycosylation-competent cells, e.g. by transfecting them with genes encoding relevant enzymes necessary for glycosylation. Exemplary enzymes include but are not limited to oligosaccharyltransferases, glycosidases, glucosidase I, glucosidease II, calnexin/calreticulin, glycosyltransferases, mannosidases, GlcNAc transferases, galactosyltransferases, and sialyltransferases.

Methods of Preparing Compositions

The invention also provides methods of preparing a composition comprising TAF glycoforms of a protein produced by cells in a cell culture. In exemplary embodiments, the method comprises (i) maintaining the cell culture at an initial pH for an initial cell culture period, as described herein, and optionally (ii) expanding the cell culture, and (iii) collecting the supernatant of the cell culture comprising the protein produced by the cells. In exemplary aspects, the method can comprise any one of the steps described herein with regard to the inventive methods of modulating (increasing or decreasing) the levels of TAF glycoforms of a protein produced by cells in a cell culture.

The method may comprise one or more steps for purifying the protein from a cell culture or the supernatant thereof and preferably recovering the purified protein. In exemplary aspects, the method comprises one or more chromatography steps, e.g., affinity chromatography (e.g., protein A affinity chromatography), ion exchange chromatography, hydrophobic interaction chromatography. In exemplary aspects, the method comprises purifying the protein using a Protein A affinity chromatography resin.

In exemplary embodiments, the method further comprises steps for formulating the purified protein, etc., thereby obtaining a formulation comprising the purified protein. Such steps are described in Formulation and Process Development Strategies for Manufacturing, eds. Jameel and Hershenson, John Wiley & Sons, Inc. (Hoboken, NJ), 2010.

The method can also comprise one or more upstream steps prior to the cell culture steps. In exemplary embodiments, the method comprises steps for generating host cells that express the protein. For example, the methods comprise, in some instances, introducing into host cells a vector comprising a nucleic acid comprising a nucleotide sequence encoding the protein.

Compositions

Provided herein are compositions comprising TAF glycoforms of a protein. In exemplary embodiments, the compositions are prepared by the inventive methods of preparing a composition comprising TAF glycoforms of a protein produced by cells in a cell culture, described herein. In exemplary aspects, at least about 10% of the protein in the composition is a TAF glycoform. In exemplary aspects, at least about 20% of the protein in the composition is a TAF glycoform. In exemplary aspects, at least about 30% of the protein in the composition is a TAF glycoform. In exemplary aspects, at least about 40% of the protein in the composition is a TAF glycoform. In exemplary aspects, at least about 50% of the protein in the composition is a TAF glycoform. In exemplary aspects, at least about 60% of the protein in the composition is a TAF glycoform. In exemplary aspects, at least about 70% of the protein in the composition is a TAF glycoform. In exemplary aspects, at least about 80% of the protein in the composition is a TAF glycoform. In exemplary aspects, at least about 90% of the protein in the composition is a TAF glycoform. In exemplary aspects, greater than about 90% or greater than about 95% of the protein in the composition is a TAF glycoform.

In exemplary aspects, the compositions of the invention have a glycoform profile which is greater than or about 10% TAF glycoforms. In exemplary aspects, the compositions of the invention have a glycoform profile which is greater than or about 20% TAF glycoforms. In exemplary aspects, the compositions of the invention have a glycoform profile which is greater than or about 30% TAF glycoforms. In exemplary aspects, the compositions of the invention have a glycoform profile which is greater than or about 40% TAF glycoforms. In exemplary aspects, the compositions of the invention have a glycoform profile which is greater than or about 50% TAF glycoforms. In exemplary aspects, the compositions of the invention have a glycoform profile which is greater than or about 60% TAF glycoforms. In exemplary aspects, the compositions of the invention have a glycoform profile which is greater than or about 70% TAF glycoforms. In exemplary aspects, the compositions of the invention have a glyform profile which is greater than or about 80% TAF glycoforms. In exemplary aspects, the compositions of the invention have a glycoform profile which is greater than or about 90% TAF glycoforms. In exemplary aspects, the compositions of the invention have a glycoform profile which is greater than or about 95% TAF glycoforms.

The compositions of the invention are, in exemplary aspects, pharmaceutical composition. In exemplary aspects, the pharmaceutical compositions comprise a pharmaceutically acceptable carrier. As used herein, the term "pharmaceutically acceptable carrier" includes any of the standard pharmaceutical carriers, such as a phosphate buffered saline solution, water, emulsions such as an oil/water or water/oil emulsion, and various types of wetting agents. The term also encompasses any of the agents approved by a regulatory agency of the US Federal government or listed in the US Pharmacopeia for use in animals, including humans.

The pharmaceutical composition can comprise any pharmaceutically acceptable ingredient, including, for example, acidifying agents, additives, adsorbents, aerosol propellants, air displacement agents, alkalizing agents, anticaking agents, anticoagulants, antimicrobial preservatives, antioxidants, antiseptics, bases, binders, buffering agents, chelating agents, coating agents, coloring agents, desiccants, detergents, diluents, disinfectants, disintegrants, dispersing agents, dissolution enhancing agents, dyes, emollients, emulsifying agents, emulsion stabilizers, fillers, film forming agents, flavor enhancers, flavoring agents, flow enhancers, gelling agents, granulating agents, humectants, lubricants, mucoadhesives, ointment bases, ointments, oleaginous vehicles, organic bases, pastille bases, pigments, plasticizers, polishing agents, preservatives, sequestering agents, skin penetrants, solubilizing agents, solvents, stabilizing agents, suppository bases, surface active agents, surfactants, suspending agents, sweetening agents, therapeutic agents, thickening agents, tonicity agents, toxicity agents, viscosity-increasing agents, water-absorbing agents, water-miscible cosolvents, water softeners, or wetting agents. See, e.g., the *Handbook of Pharmaceutical Excipients*, Third Edition, A. H. Kibbe (Pharmaceutical Press, London, U K, 2000), which is incorporated by reference in its entirety. *Remington's Pharmaceutical Sciences*, Sixteenth Edition, E. W. Martin (Mack Publishing Co., Easton, Pa., 1980), which is incorporated by reference in its entirety In exemplary aspects, the pharmaceutical composition comprises formulation materials that are nontoxic to recipients at the dosages and concentrations employed. In specific embodiments, pharmaceutical compositions comprising a therapeutically effective amount TAF glycoforms of a protein and one or more pharmaceutically acceptable salts; polyols; surfactants; osmotic balancing agents; tonicity agents; anti-oxidants; antibiotics; antimycotics; bulking agents; lyoprotectants; anti-foaming agents; chelating agents; preservatives; colorants; analgesics; or additional pharmaceutical agents. In exemplary aspects, the pharmaceutical composition comprises one or more polyols and/or one or more surfactants, optionally, in addition to one or more excipients, including but not limited to, pharmaceutically acceptable salts; osmotic balancing agents (tonicity agents); anti-oxidants; antibiotics; antimycotics; bulking agents; lyoprotectants; anti-foaming agents; chelating agents; preservatives; colorants; and analgesics.

In certain embodiments, the pharmaceutical composition may contain formulation materials for modifying, maintaining or preserving, for example, the pH, osmolarity, viscosity, clarity, color, isotonicity, odor, sterility, stability, rate of dissolution or release, adsorption or penetration of the composition. In such embodiments, suitable formulation materials include, but are not limited to, amino acids (such as glycine, glutamine, asparagine, arginine or lysine); anti-microbials; antioxidants (such as ascorbic acid, sodium sulfite or sodium hydrogen-sulfite); buffers (such as borate, bicarbonate, Tris-HCl, citrates, phosphates or other organic acids); bulking agents (such as mannitol or glycine); chelating agents (such as ethylenediamine tetraacetic acid (EDTA)); complexing agents (such as caffeine, polyvinylpyrrolidone, beta-cyclodextrin or hydroxypropyl-beta-cyclodextrin); fillers; monosaccharides; disaccharides; and other carbohydrates (such as glucose, mannose or dextrins); proteins (such as serum albumin, gelatin or immunoglobulins); coloring, flavoring and diluting agents; emulsifying agents; hydrophilic polymers (such as polyvinylpyrrolidone); low molecular weight polypeptides; salt-forming counterions (such as sodium); preservatives (such as benzalkonium chloride, benzoic acid, salicylic acid, thimerosal, phenethyl alcohol, methylparaben, propylparaben, chlorhexidine, sorbic acid or hydrogen peroxide); solvents (such as glycerin, propylene glycol or polyethylene glycol); sugar alcohols (such as mannitol or sorbitol); suspending agents; surfactants or wetting agents (such as pluronics, PEG, sorbitan esters, polysorbates such as polysorbate 20, polysorbate, triton, tromethamine, lecithin, cholesterol, tyloxapal); stability enhancing agents (such as sucrose or sorbitol); tonicity enhancing agents (such as alkali metal halides, preferably sodium or potassium chloride, mannitol sorbitol); delivery vehicles; diluents; excipients and/or pharmaceutical adjuvants. See, REMINGTON'S PHARMACEUTICAL SCIENCES, 18" Edition, (A. R. Genrmo, ed.), 1990, Mack Publishing Company.

The pharmaceutical compositions may be formulated to achieve a physiologically compatible pH. In some embodiments, the pH of the pharmaceutical composition may be for example between about 4 or about 5 and about 8.0 or about 4.5 and about 7.5 or about 5.0 to about 7.5. In exemplary embodiments, the pH of the pharmaceutical composition is between 5.5 and 7.5.

The following examples are given merely to illustrate the present invention and not in any way to limit its scope.

EXAMPLES

Example 1

This example demonstrates that the initial cell culture pH modulates the levels of particular glycoforms of a recombinant glycosylated protein produced by cells in cell culture and that any changes in pH made after the initial cell culture period has little to no impact on the glycoform levels.

Material and Methods

Cell Lines, Cell Culture and Media

Cells of a CHO cell line expressing a recombinant antibody of isotype IgG1 was maintained in 3 L Erlenmeyer shake flasks (Corning Life Sciences, Lowell, MA) with 1 L working volume. Cells were cultivated under standard humidified condition at 36° C. and 5% $CO_2$ and were shaken at 70 rpm in an automatic $CO_2$ incubator (Thermo Fisher Scientific, Waltham, MA). All cells were subcultured in culture media containing different concentrations of methotrexate (MTX) for every three days, and were transferred, inoculated and cultured in culture media for four days before inoculation to bioreactors. Cell culture production media was used as the control media in the study. Cell culture media components include growth factors, amino acids, buffers, nutrients, trace elements, vitamins, surfactants, salts, nucleotides, hormones, lipids, and other organic compounds.

Bioreactors Perfusion Process

Culturing is carried out by batch processes or perfusion processes, and at standard temperature and dissolved oxygen conditions.

Cell Growth, Metabolites and Antibody Titer Analysis

Viable cell density and viability were determined using the Nova CDV (Nova Biomedical, Waltham, MA). For bioreactor samples, metabolites including glucose, lactate, ammonia, glutamine, glutamate were obtained from Nova Flex (Nova Biomedical, Waltham, MA).

Hydrophilic Interaction Liquid Chromatography (HILIC) Glycan Map

The glycan map of enzymatically released N-linked glycans was determined using HILIC. Briefly, glycans were incubated with a solution comprising PNGase F and a sodium phosphate buffer (pH 7.5) for ~2 hours at ~37° C. A labeling solution comprising 2-aminobenzoic acid (2-AA) and sodium cyanoborohydride was then added to the PNGase F-treated glycans and the mixture was incubated for ~80° C. for about 75 minutes. After incubation, the mixtures were centrifuged to obtain a pellet of precipitated protein. Supernatants were collected and placed in vials.

The glycans were separated by HILIC, in line with a fluorescence detector: Glycans were injected and bound to the column in high organic conditions (Mobile Phase A and Mobile Phase B were ammonium formate and acetonitrile, respectively) and then eluted with an increasing gradient of an aqueous ammonium formate buffer. High resolution was achieved using a 1.7 μm small particle column format and 150 mm column length. The total run time, including column re-equilibration was 155 minutes.

Design of Experiments

Groups of CHO cells producing the IgG1 antibody were cultured at one of three initial set point pHs: 6.85, 6.95, or 7.1. The pH was maintained for the first 6 days post-inoculation (where inoculation occurred at Day 0). For at least two groups of cells, the pH was shifted around Day 6. The pH of one group of cells was shifted from 6.85 to 6.95 and the pH of at least one other group was shifted from 7.1 to 6.95. For at least three groups of cells, the pH was not shifted and pH was maintained at 6.85, 6.95, or 7.10.

The cells were cultured for 12 days total. Viable cell density (VCD) was measured throughout the 12-day culture period and the results are shown in Table 1.

TABLE 1

| Day | Data Ranges VCD ($10^5$ cells/mL) |
| --- | --- |
| 0 | 7-13 |
| 1 | 10-19 |
| 2 | 18-35 |
| 3 | 30-69 |
| 4 | |
| 5 | 82-194 |
| 6 | 121-346 |
| 7 | 191-567 |

TAF levels, high mannose (HM) glycan levels and afucosylated (AF) glycan levels were measured on several days after the 4th day of cell culture and the observed results and the expected model results are shown in Table 2.

TABLE 2

| | Exemplary Ranges |
| --- | --- |
| TAF (%) | 2.8-7.5 |
| HM (%) | 1.8-2.8 |
| AF (%) | 1.5-2.3 |
| Set Point pH | 6.85-7.1 |

Figure 3:
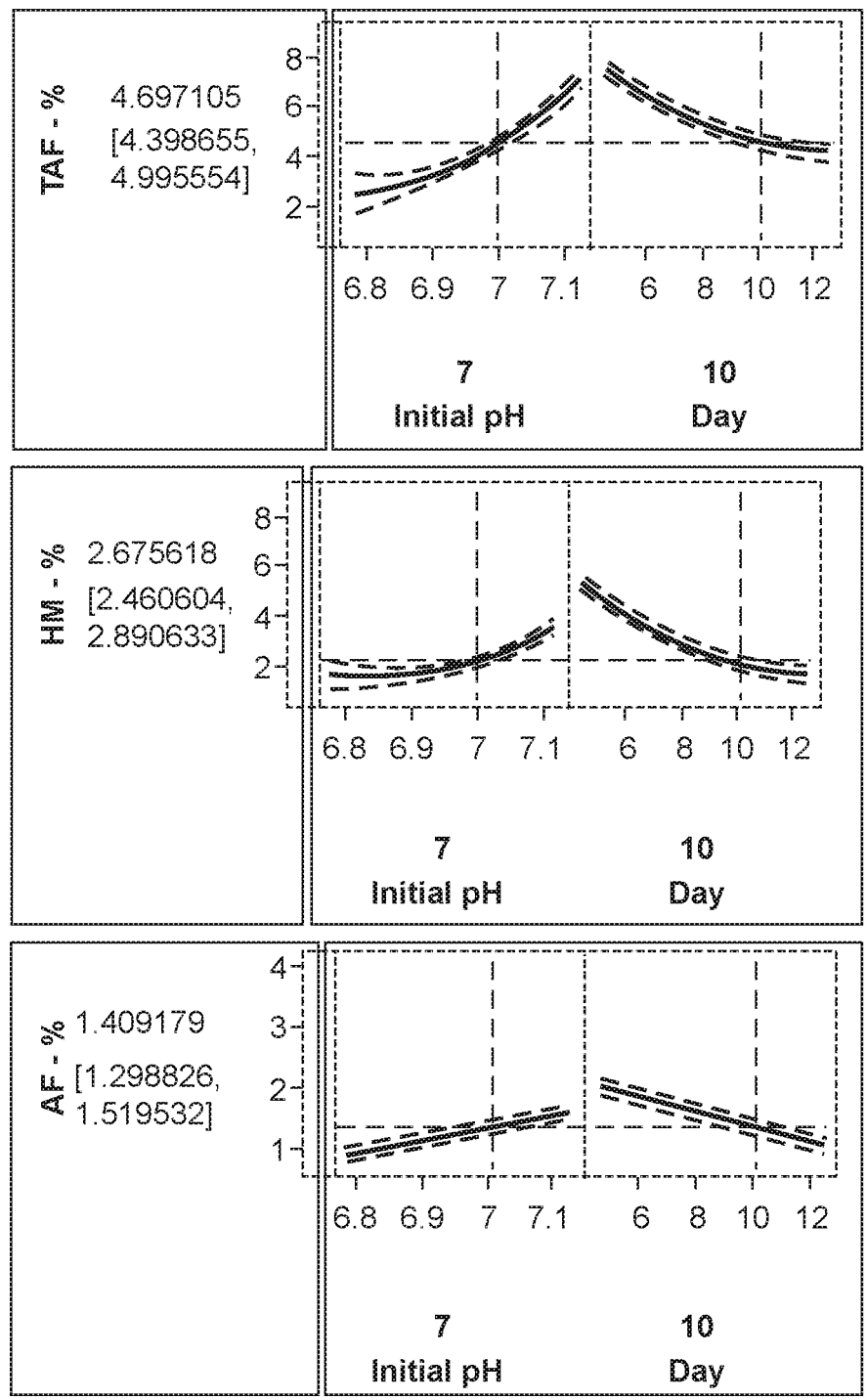
FIG. 3 is a set of graphs correlating TAF (%), HM (%), or AF (%) as a function of initial pH or time.
Figure 4:
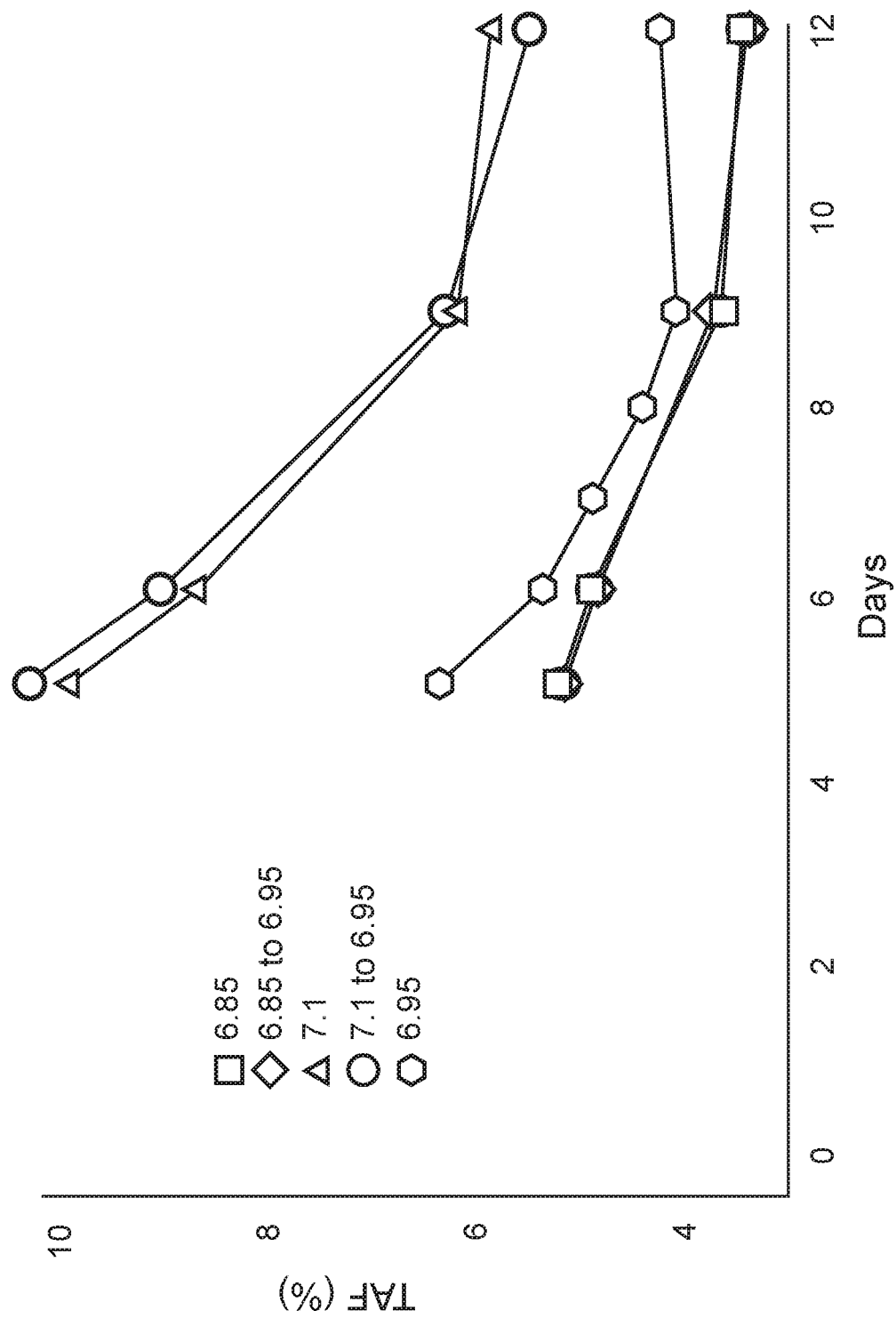
FIG. 4 is a graph of the % TAF present in the cell culture as a function of time for different pH set points.

Unexpectedly, the initial pH was positively associated with TAF levels (FIG. 3). As pH increased, so did TAF levels. As shown in FIG. 4, the TAF levels of cell cultures maintained at pH of 7.1 or maintained at 7.1 then shifted to 6.95 at around Day 6 were greater than those of other groups maintained at lower pHs, 6.95 or 6.85. An approximate 2-fold or greater increase was observed. Also, as shown in FIG. 4, the TAF levels of cell cultures maintained at pH of 6.85 or maintained at 6.85 then shifted to 6.95 were less than those of other groups maintained at higher pHs 6.95 and 7.1.

Figure 5:
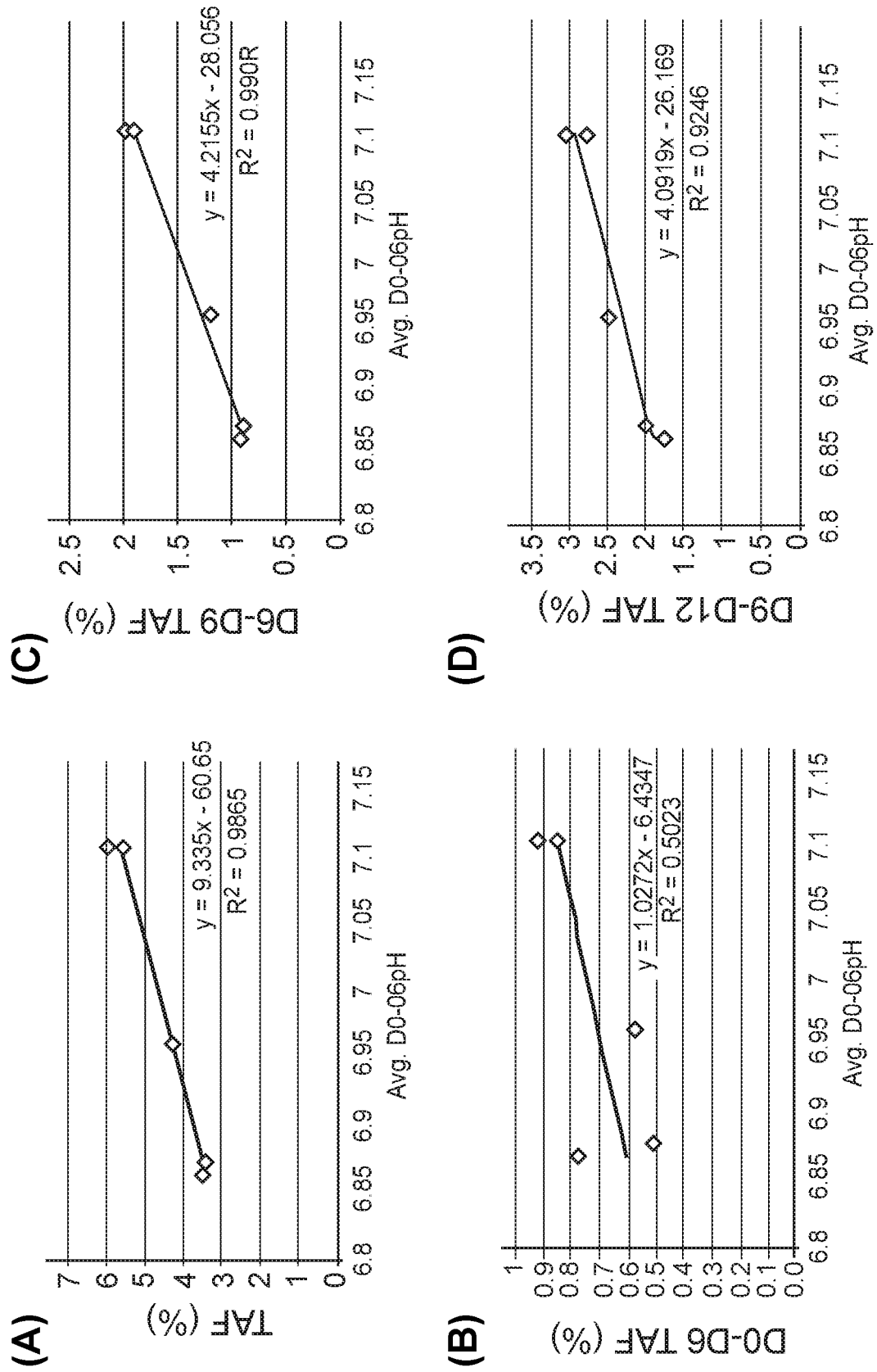
FIG. 5 is a set of graphs depicting % TAF present in the cell culture (during the indicated times) as a function of average initial pH of the cell culture. (A) is a graph of the % TAF; (B) is a graph of the % TAF from Day 0 to Day 6; (C) is a graph of the % TAF from Day 6 to Day 9, and (D) is a graph of the % TAF from Day 9 to Day 12.
Figure 6:
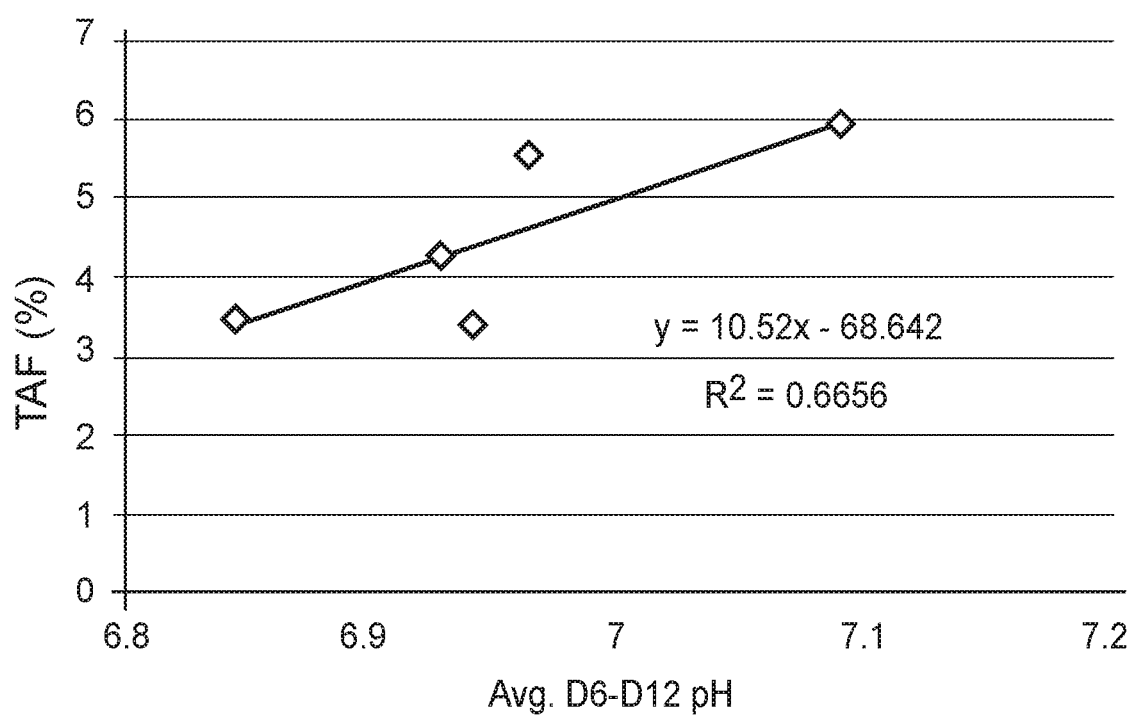
FIG. 6 is a graph of % TAF as a function of pH of the cell culture from Day 6 to Day 12.

Statistical analysis of these results was conducted. FIG. 5 demonstrates the different correlations of the initial set point pH to TAF during the cell culture periods Days 0-6, Days 6-9, Days 9-12, and Day 12. The correlation of initial pH to TAF in each time period was strong. As shown in FIG. 6, the correlation of final pH (pH after initial cell culture period) to the TAF (TAF levels after initial cell culture period) is weak.

The effect of final pH (pH after initial cell culture period) was evaluated. Two groups of cells were cultured for 12 days. For both groups, the cells were cultured at a pH of 6.95 for the initial 5 days of cell culture. While Group 1 was maintained at this pH for the following subsequent days, the pH of Group 2 was shifted to 6.85 for Days 5 to Day 9, and then shifted to 7.1 from Day 9 to Day 12. As shown in FIG. 7, both groups demonstrated highly similar TAF levels. These results suggest that modulation of pH after day 5 does not impact the TAF levels.

This example demonstrated the impact of pH during the initial cell culture period on the levels of TAF.

Example 2

This example provides another example of how cell culture pH during the initial cell culture period impacts the levels of TAF.

Cell culture in bioreactors following a perfusion process was carried out as essentially described in Example 1, except that cells expressed a recombinant IgG4 antibody. The working volume of the culture was 1.5 L and the duration of the culture was 15 days. The initial temperature was either 36° C. or 37° C. and the initial pH ranged from 6.65-6.9. The temperature was shifted to a temperature between 34 and 36° C. after Day 5 (between Day 5 and 8). Table 3 outlines the different experimental conditions of this study.

TABLE 3

| Run No. | Pre-Shift Temp (°C.) | Post-Shift Temp (°C.) | pH set-point |
| --- | --- | --- | --- |
| 1 | 37 | 34 | 6.78 |
| 2 | 37 | 36 | 6.65 |
| 3 | 37 | 35 | 6.65 |
| 4 | 37 | 36 | 6.9 |
| 5 | 36 | 34 | 6.9 |
| 6 | 37 | 36 | 6.775 |
| 7 | 37 | 34 | 6.9 |
| 8 | 37 | 34 | 6.65 |
| 9 | 37 | 34 | 6.775 |
| 10 | 36 | 36 | 6.65 |
| 11 | 36 | 36 | 6.65 |
| 12 | 36 | 35 | 6.775 |
| 13 | 37 | 35 | 6.9 |
| 14 | 37 | 34 | 6.9 |
| 15 | 37 | 35 | 6.65 |
| 16 | 36 | 35 | 6.775 |
| 17 | 36 | 36 | 6.9 |
| 18 | 36 | 34 | 6.65 |
| 19 | 36 | 34 | 6.9 |
| 20 | 36 | 34 | 6.65 |
| 21 | 36 | 36 | 6.9 |

Figure 8:
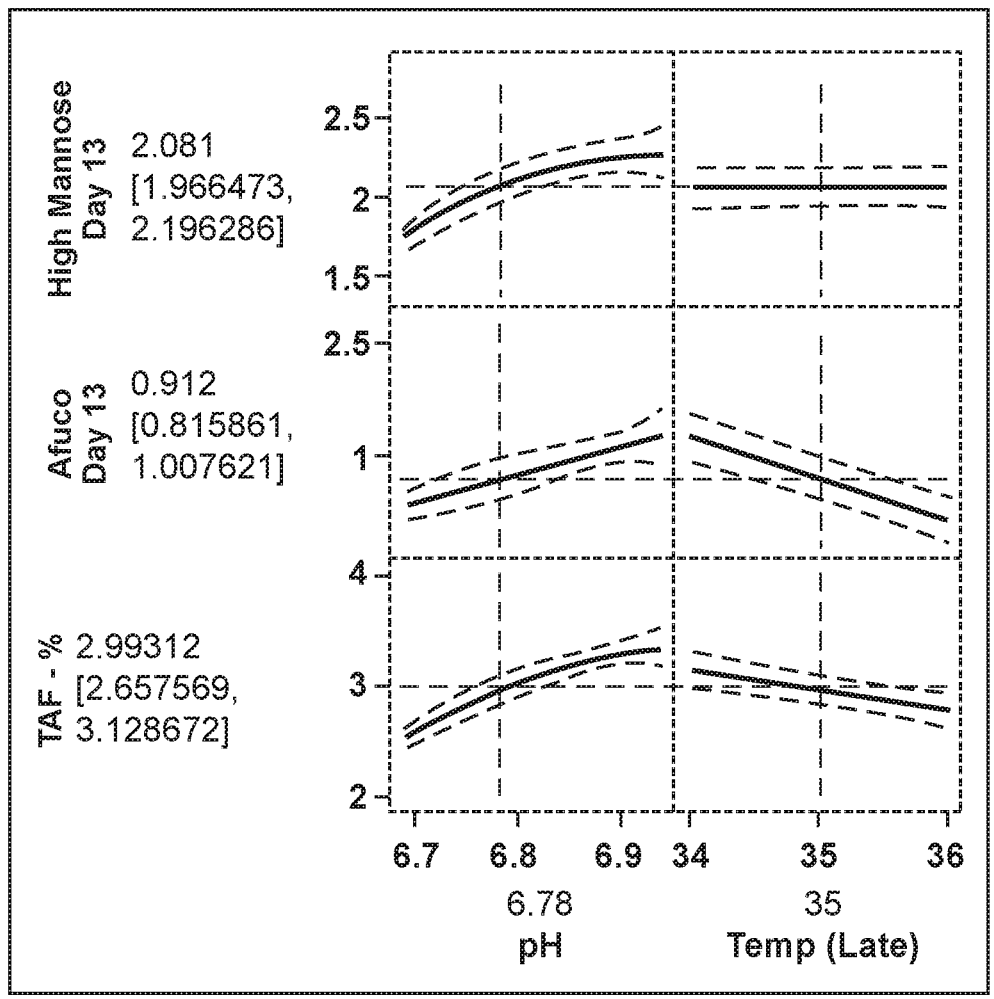
FIG. 8 is a set of graphs correlating HM, afuco or TAF (%) vs pH or post-shift temperature.

Levels of HM and afucosylated glycoforms were measured as described in Example 1. The sum of the two levels were calculated and labeled as total afucosylated glycoforms. HM ranged from 1.4-2.6% and afucosylated glycoforms from 0.7-1.6. TAF levels ranged from 2.1-3.9. As shown in FIG. 8, both pH and final temperature impacted TAF. pH exhibited a positive correlation and final temperature displayed a negative correlation.

Example 3

This example demonstrates the effect the initial pH of the initial cell culture period has on TAF levels as well as the effect a pH shift after the initial cell culture period has on TAF levels.

Cells expressing an IgG1 antibody were cultured in bioreactors following a perfusion process, as essentially described in Example 1. The cells were cultured for 12 days total and were maintained at a temperature of about 36° C. The cells were cultured at one of three initial set point pHs (6.85, 6.95, or 7.05), and the pH was shifted (either up or down) during the initial cell culture period (at Day 1) or after the initial cell culture period (at Day 5). Cells of Group A were cultured at an initial set point pH of 7.05, cells of Group B were cultured at an initial set point pH of 6.85, while cells of Group C were cultured at an initial set point pH of 6.95. Cells of Group A were divided into two subgroups: Subgroup A1 and Subgroup A2. Cells of Subgroup A1 were cultured at an initial set point pH of 7.05 and the pH was shifted to 6.95 during the initial cell culture period (at Day 1), while cells of Subgroup A2 were cultured at an initial set point pH of 7.05 and the pH was shifted to 6.95 after the initial cell culture period (at Day 5). Cells of Group B were subjected to a pH upshift to 6.95 after the initial cell culture period (at Day 5) and cells of Group C were subjected to a downshift to 6.85 after the initial cell culture period (at Day 5). In a series of control cultures, the pH was set and maintained at 6.95 for the entire duration of the culture period (i.e., without a pH shift).

After the 12-day culture period, the TAF glycoforms of the IgG1 antibodies produced by each of group was measured as essentially described in Example 1 via HILIC. The % TAF of the antibodies produced by the control cultures ranged from about 3.1% to about 4.14%. Relative to the antibodies produced by the control cultures, the mean % TAF of the antibodies produced by Group A was higher, while the mean % TAF of the antibodies produced by Group B was lower. A higher initial pH correlated with a higher % TAF and a lower initial pH correlated with a lower % TAF.

Interestingly, the % TAF of the IgG1 antibodies produced by the cells of Subgroup A2 were highly similar to the TAF of the antibodies produced by Subgroup A2, suggesting that a pH shift after the initial cell culture period did not impact the TAF level. This observation was further supported by the observation that the TAF levels of the antibodies produced by the cells of Group C were highly similar to the TAF levels of the control cell cultures. Even though the cells of Group C were subjected to a downward pH shift, the TAF was roughly the same as the control cultures, since the shift occurred after the initial cell culture period (at Day 5).

This example demonstrated that a pH shift occurring after the initial cell culture period does not significantly impact the TAF levels and that a higher set point pH trends toward higher TAF levels, while a lower set point pH trends toward lower TAF levels.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the disclosure (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

Recitation of ranges of values herein are merely intended to serve as a shorthand method of referring individually to each separate value falling within the range and each endpoint, unless otherwise indicated herein, and each separate value and endpoint is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A method of modulating the levels of total afucosylated (TAF) glycoforms of an IgG1 or IgG4 antibody composition produced by glycosylation-competent Chinese Hamster Ovary (CHO) cells in a perfusion cell culture, comprising
   (i) maintaining the perfusion cell culture at an initial set point pH and an initial temperature for an initial cell culture period of 4 days to 6 days,
   (ii) shifting the temperature by more than 2° C. after the initial cell culture period, and
   (iii) collecting the supernatant of said cell culture comprising the IgG1 or IgG4 antibody composition after culturing the glycosylation-competent CHO cells for a period of at least 10 days, wherein the level of TAF of the IgG1 or IgG4 antibody composition is less than 10% and is modulated by not more than 6%,
   wherein the initial set point pH is selected from a pH that is greater than 6.50 and less than 7.5 and the initial temperature is between 30° C. and 40° C.,
   wherein the temperature of the cell culture does not shift by more than 1° C. during the initial cell culture period,
   wherein the osmolality of the cell culture is about 200 mOsm/kg to about 500 mOsm/kg and the dissolved oxygen (DO) level of the cell culture is about 50 mmHg to about 100 mmHg or about 20% to about 60% oxygen saturation.

2. The method of claim 1, wherein the initial set point pH is higher than a control pH of a control cell culture and the levels of TAF glycoforms of the recombinant glycosylated protein after the initial cell culture period are increased, relative to the control cell culture, wherein the control cell culture is a cell culture maintained in the same manner as the cell culture on which the said method is carried out, except for the pH during the initial cell culture period.

3. The method of claim 1, wherein the initial pH is lower than a control pH of a control cell culture and the levels of TAF glycoforms of the recombinant glycosylated protein after the initial cell culture period are decreased, relative to the control cell culture, wherein the control cell culture is a cell culture maintained in the same manner as the cell culture on which the said method is carried out, except for the pH during the initial cell culture period.

4. The method of claim 1, wherein the pH does not shift by more than 0.05 during the initial cell culture period of 4 days to 6 days.

5. The method of claim 1, wherein the initial temperature is about 36° C. or about 37° C.

6. The method of claim 1, comprising decreasing the temperature by 3° C., 4° C., 5° C. or 6° C.

7. The method of claim 1, wherein the initial cell culture period is 4 days.

8. The method of claim 1, wherein the initial cell culture period is 5 days.

9. The method of claim 1, wherein the initial cell culture period is 6 days.

10. The method of claim 1, wherein the initial set point pH is less than 7.2.

11. The method of claim 1, wherein the initial set point pH is less than 7.1.

12. The method of claim 1, wherein the initial set point pH is less than 7.0.

13. The method of claim 1, wherein the level of TAF glycoforms of the IgG1 or IgG4 antibody composition of the supernatant ranges from 2.1% to 3.9% or 2.8% to 7.5%.

14. The method of claim 1, wherein the level of high mannose (HM) glycoforms of the IgG1 or IgG4 antibody composition of the supernatant ranges from 1.4% to 2.6% or 1.8% to 2.8%.

15. The method of claim 1, wherein the level of afucosylated (AF) glycoforms of the IgG1 or IgG4 antibody composition of the supernatant ranges from 0.7% to 1.6% or 1.5% to 2.3%.

16. The method of claim 1, wherein the cell culture medium comprises glucose, glutamine, and/or glutamate.

17. A method of modulating the levels of total afucosylated (TAF) glycoforms of an IgG1 or IgG4 antibody composition produced by glycosylation-competent Chinese Hamster Ovary (CHO) cells in a perfusion cell culture, comprising
  (i) maintaining the perfusion cell culture at an initial set point pH until the cell culture reaches a viable cell density (VCD) of $8.2 \times 10^6$ cells per mL;
  wherein the temperature of the cell culture does not shift by more than 1° C. from an initial temperature while maintaining the cell culture at the initial set point pH,
  wherein the initial set point pH is greater than 6.50 and less than 7.5 and the initial temperature is between 30° C. and 40° C.,
  (ii) shifting the temperature by more than 2° C. after the VCD reaches $8.2 \times 10^6$ cells per mL, and
  (iii) collecting the supernatant of said cell culture comprising the IgG1 or IgG4 antibody composition after culturing the glycosylation-competent CHO cells for a period of at least 10 days, wherein the level of TAF glycoforms of the IgG1 or IgG4 antibody composition is less than 10% and is modulated by not more than 6%,
  wherein the osmolality of the cell culture is about 200 mOsm/kg to about 500 mOsm/kg and the dissolved oxygen (DO) level of the cell culture is about 50 mmHg to about 100 mmHg or about 20% to about 60% oxygen saturation.

18. The method of claim 17, wherein the cell culture medium comprises glucose, glutamine, and/or glutamate.

* * * * *